United States Patent
Yoshii

(10) Patent No.: US 10,160,188 B2
(45) Date of Patent: Dec. 25, 2018

(54) REINFORCED PAPER BOARD AND PALLET USING SAME

(71) Applicant: ECOBOARD CO., LTD., Okayama (JP)

(72) Inventor: Hisayoshi Yoshii, Okayama (JP)

(73) Assignees: HISAFUMI YOSHII, Okayama (JP); ECOBOARD CO., LTD., Okayama (JP)

( * ) Notice: Subject to any disclaimer, the term of this patent is extended or adjusted under 35 U.S.C. 154(b) by 0 days.

(21) Appl. No.: 15/555,341

(22) PCT Filed: Mar. 4, 2016

(86) PCT No.: PCT/JP2016/001215
§ 371 (c)(1),
(2) Date: Sep. 1, 2017

(87) PCT Pub. No.: WO2016/139961
PCT Pub. Date: Sep. 9, 2016

(65) Prior Publication Data
US 2018/0037015 A1   Feb. 8, 2018

(30) Foreign Application Priority Data

Mar. 5, 2015 (JP) ................. 2015-043646
Mar. 5, 2015 (JP) ................. 2015-043647
Jul. 30, 2015 (JP) ................. 2015-151102
Dec. 24, 2015 (JP) ................. 2015-251801

(51) Int. Cl.
| | | |
|---|---|---|
| B32B 29/08 | (2006.01) | |
| B32B 3/12 | (2006.01) | |
| B32B 3/28 | (2006.01) | |
| D21H 27/30 | (2006.01) | |
| B32B 37/14 | (2006.01) | |
| B32B 29/00 | (2006.01) | |
| D21H 27/40 | (2006.01) | |

(52) U.S. Cl.
CPC ............. B32B 29/08 (2013.01); B32B 3/12 (2013.01); B32B 3/28 (2013.01); B32B 29/005 (2013.01); B32B 37/14 (2013.01); D21H 27/30 (2013.01); D21H 27/40 (2013.01); *B32B 2250/26* (2013.01); *B32B 2307/546* (2013.01); *B32B 2307/732* (2013.01); *B32B 2309/105* (2013.01)

(58) Field of Classification Search
CPC .. B32B 29/08; B32B 3/12; B32B 3/28; B32B 37/14; B32B 2307/546; B32B 2309/105; D21H 7/30
USPC .......................................................... 428/535
See application file for complete search history.

(56) References Cited

U.S. PATENT DOCUMENTS 4,714,026 A * 12/1987 Yamaguchi ........ B65D 19/0012
108/57.29
2012/0052238 A1    3/2012 Daniel

FOREIGN PATENT DOCUMENTS

| CN | 1663766 A | 9/2005 |
|---|---|---|
| JP | 54-135095 | 10/1979 |
| JP | 56-117655 | 9/1981 |
| JP | 61-172026 U | 10/1986 |
| JP | 01-1540129 U | 10/1989 |
| JP | 03-010832 A | 1/1991 |
| JP | 04-244397 A | 9/1992 |
| JP | 06-039390 U | 5/1994 |
| JP | 07-017543 A | 1/1995 |
| JP | 3013911 | 5/1995 |
| JP | 08-197696 A | 8/1996 |
| JP | 10-337687 | * 12/1998 |
| JP | 10-337687 A | 12/1998 |
| JP | 11-342551 | * 12/1999 |
| JP | 11-342551 A | 12/1999 |
| JP | 2000-326435 A | 11/2000 |
| JP | 2001-253000 A | 9/2001 |
| JP | 2002-370739 | * 12/2002 |
| JP | 2002-370739 A | 12/2002 |
| JP | 2004-131126 A | 4/2004 |
| JP | 2009-46140 | * 3/2009 |

(Continued)

OTHER PUBLICATIONS

Official Action for related Japanese Patent Application No. 2015-151102 dated Mar. 3, 2016.

(Continued)

*Primary Examiner* — Leszek B Kiliman
(74) *Attorney, Agent, or Firm* — Renner, Otto, Boisselle & Sklar, LLP

(57) ABSTRACT

The present invention addresses the problem of increasing the bending strength of a board consisting of paper, the increased bending strength being obtained without largely increasing the thickness of the board. The present invention provides a board consisting of paper, the board comprising a board-shaped structure and a paperboard layer which is adhered to the board-shaped structure. The board-shaped structure includes a core, a first paper liner layer, and a second paper liner layer, the first and second paper liner layers being adhered to the core so that the core is sandwiched and held between the first and second paper liner layers. The paperboard layer is adhered to the first paper liner layer, the thickness of the board-shaped structure is in the range of approximately 15 mm to approximately 40 mm, the thickness of each of the first paper liner layer and the second paper liner layer is in the range of approximately 0.5 mm to approximately 1.2 mm, and the thickness of the paperboard layer is in the range of approximately 1 mm to approximately 4 mm.

12 Claims, 21 Drawing Sheets

(56) References Cited

FOREIGN PATENT DOCUMENTS

| JP | 2009-46140 A | 3/2009 |
|---|---|---|
| JP | 2010-106497 A | 5/2010 |

OTHER PUBLICATIONS

Official Action for related Japanese Patent Application No. 2015-043647 dated May 14, 2015.
International Search Report for corresponding International Application No. PCT/JP2016/001215 dated Mar. 29, 2016.
Official Action for related Chinese Patent Application No. 201680001622.3 dated Nov. 17, 2017.
Supplementary European Search Report for related European Patent Application No. 16758657.7 dated Jul. 13, 2018.
Communication pursuant to Rules 70(2) and 70(2a) EPC for related European Patent Application No. 16758657.7 dated Jul. 31, 2018.
Official Action for related Chinese Patent Application No. 201680001622.3 dated May 7, 2018.

\* cited by examiner

[Fig. 1A]
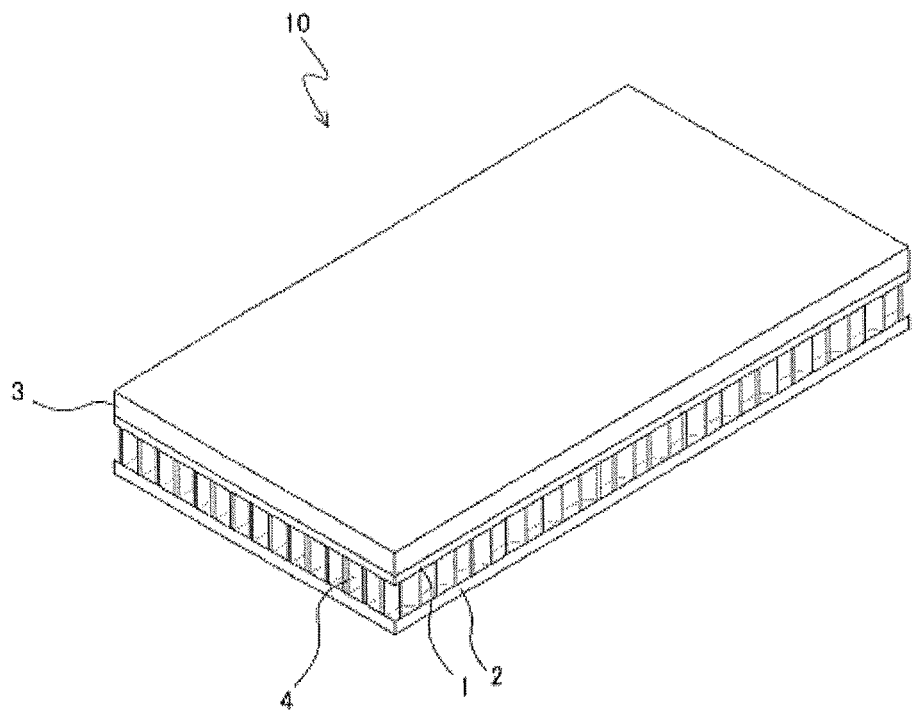
[Fig. 1B]
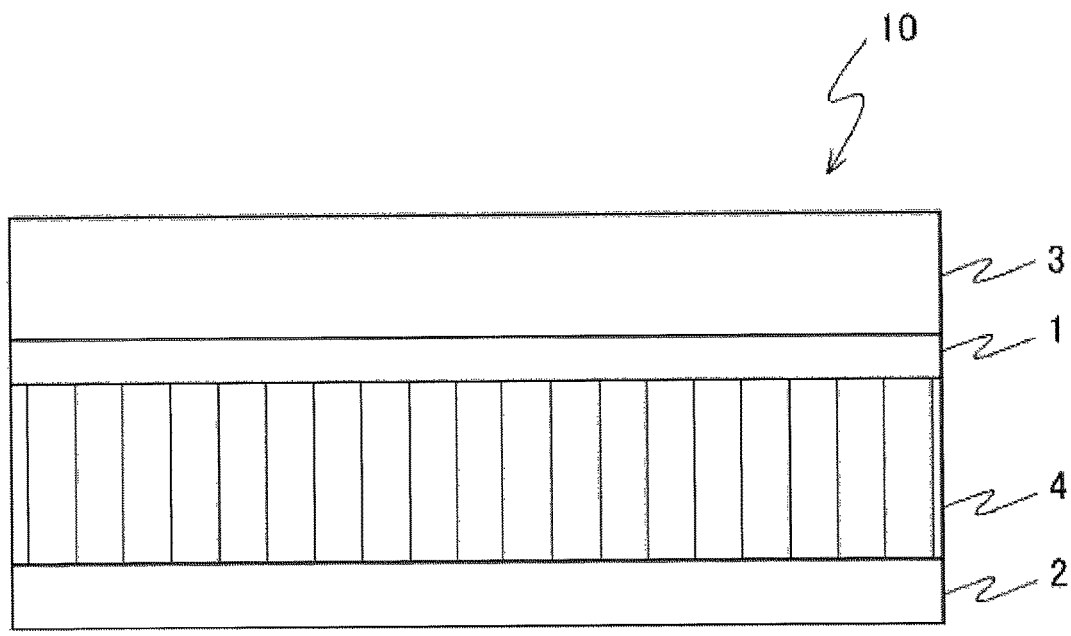

[Fig. 2A]
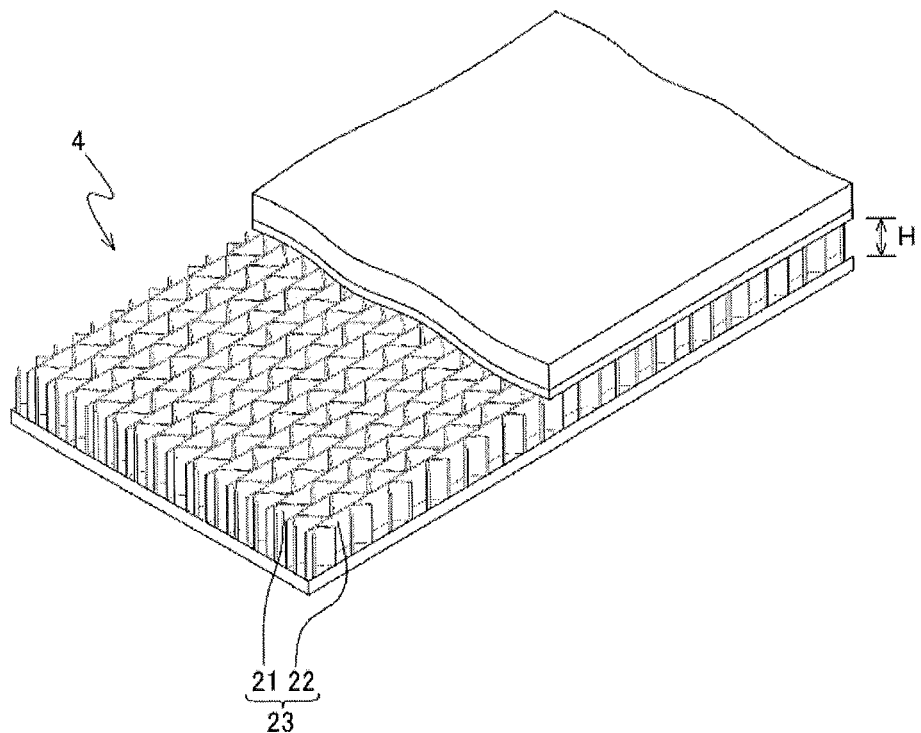
21 22
23
[Fig. 2B]
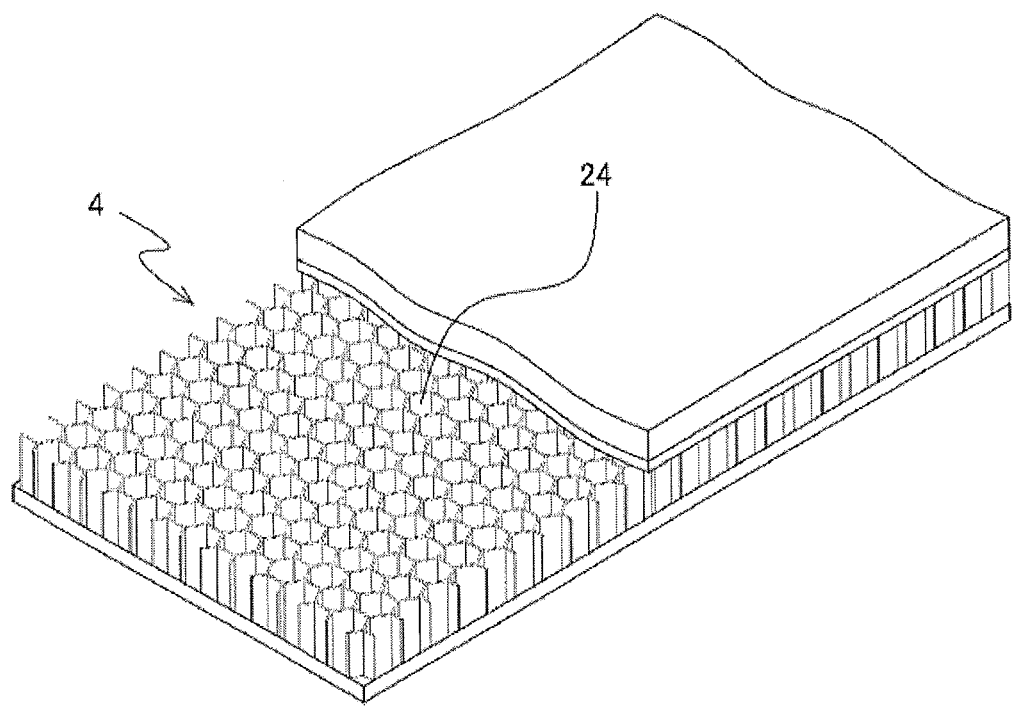

[Fig. 3A]
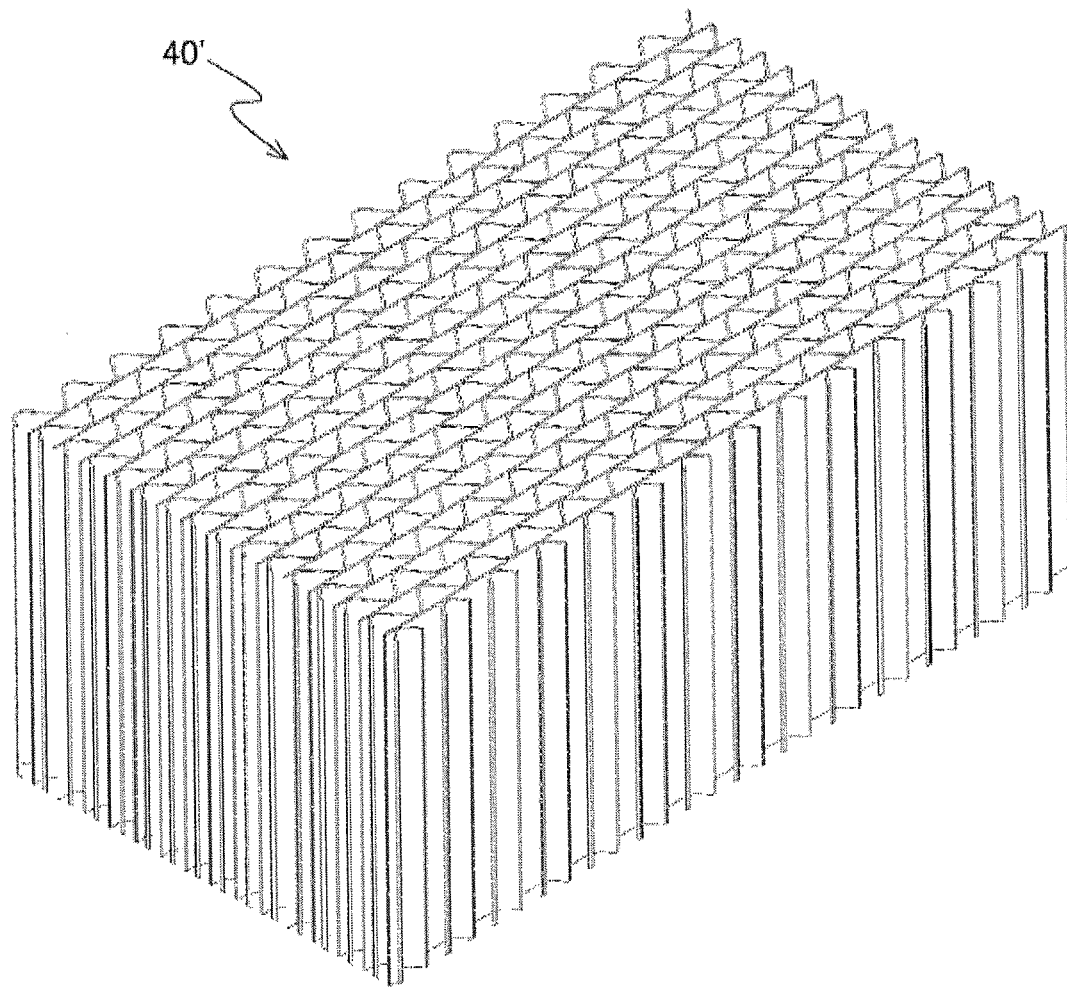

[Fig. 3B]
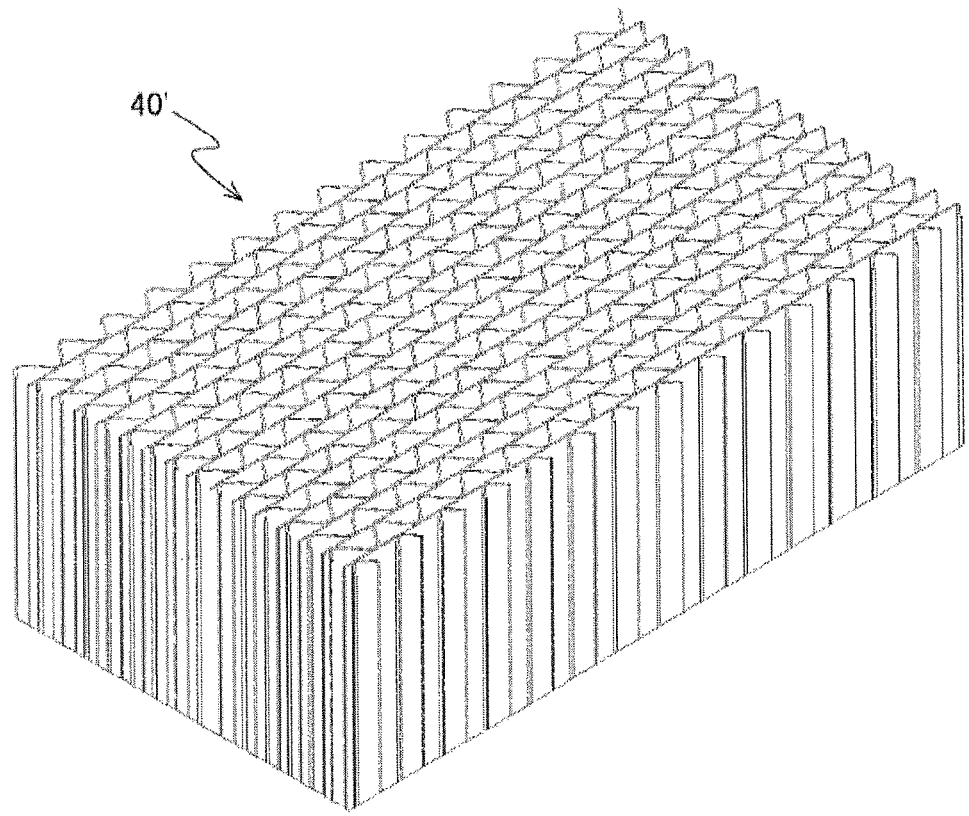
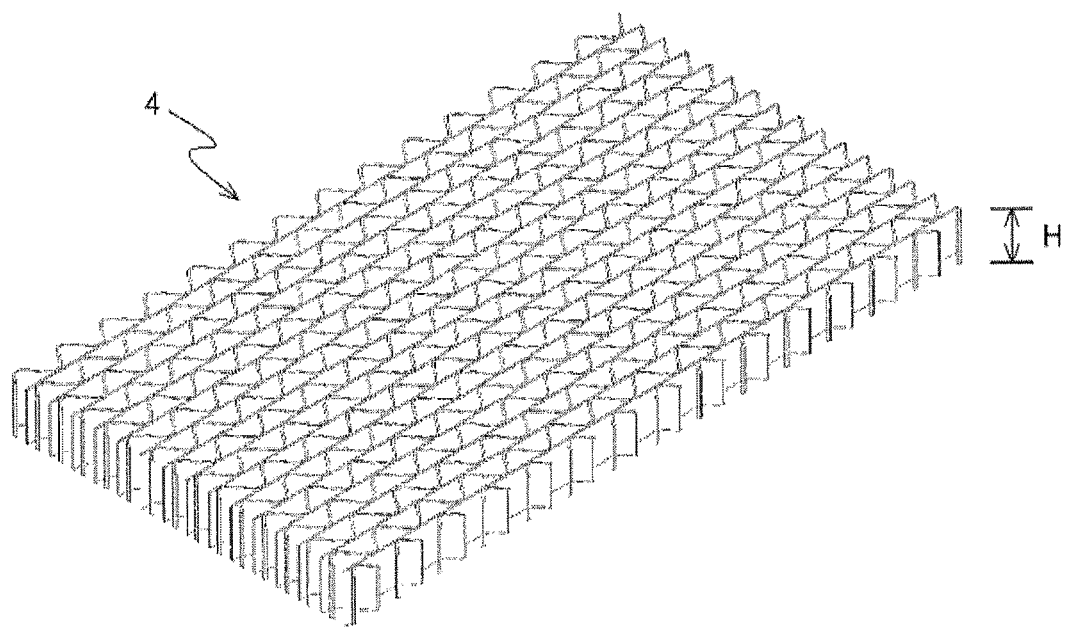

[Fig. 3C]
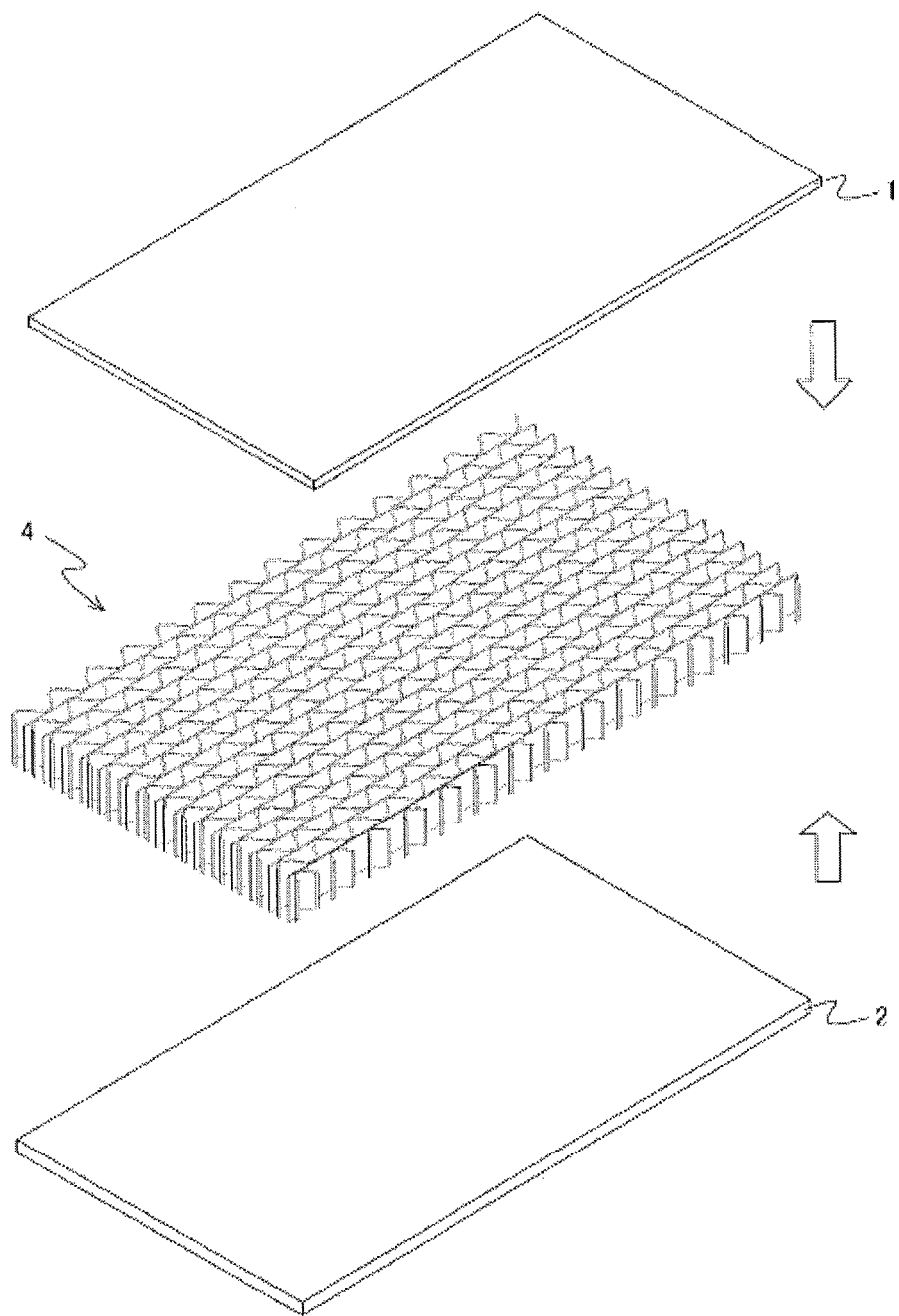

[Fig. 3D]
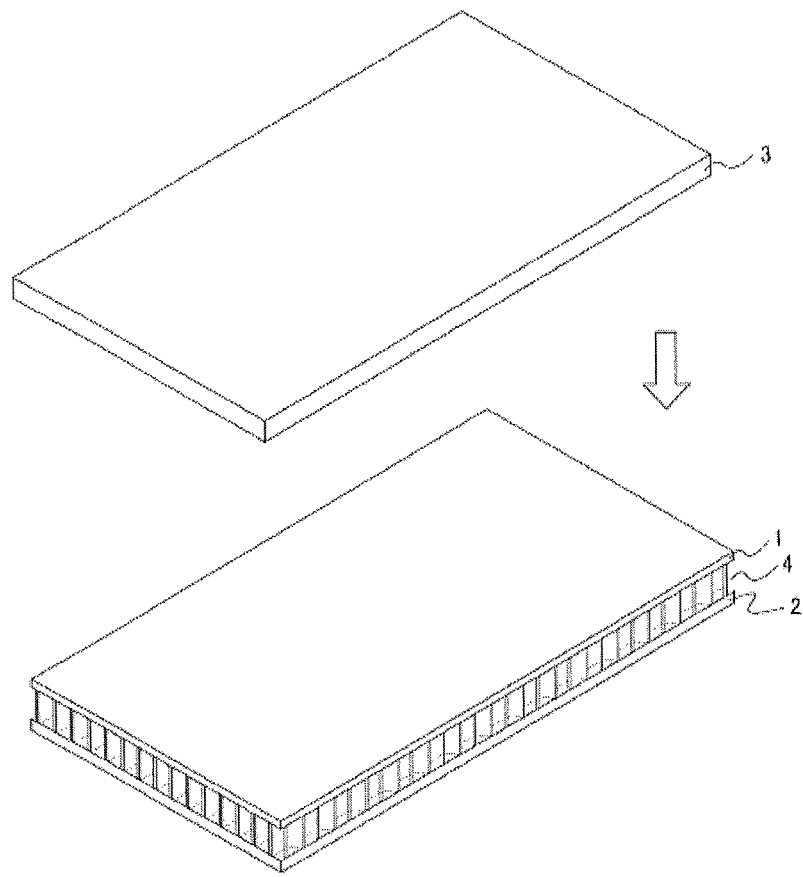
[Fig. 4]
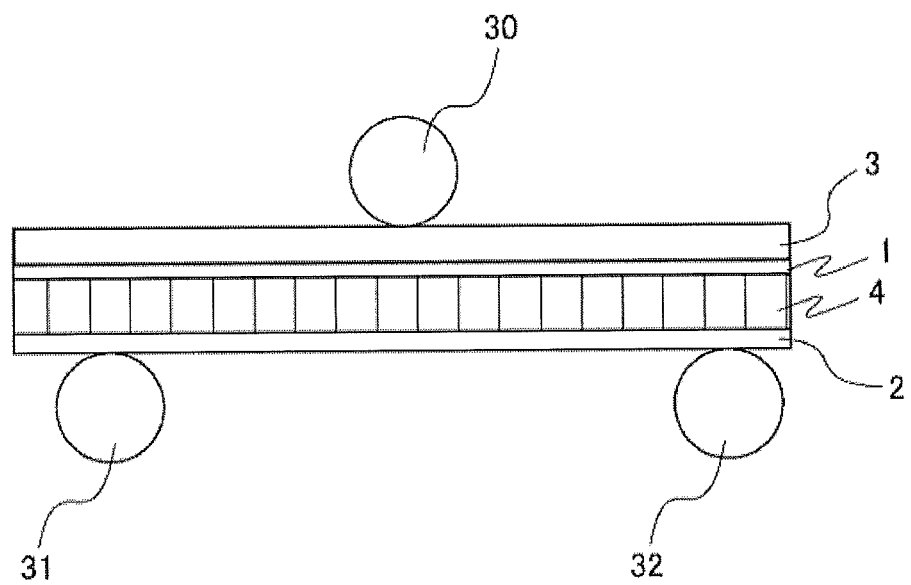

[Fig. 5A]
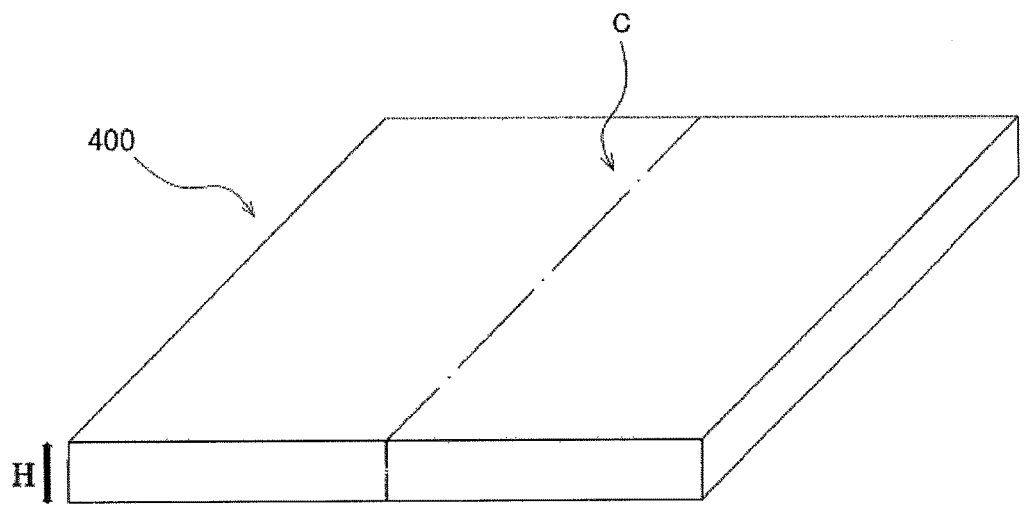
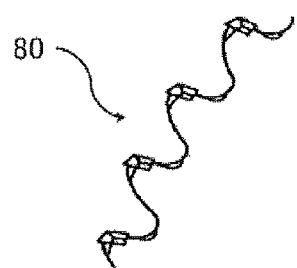
[Fig. 5B]
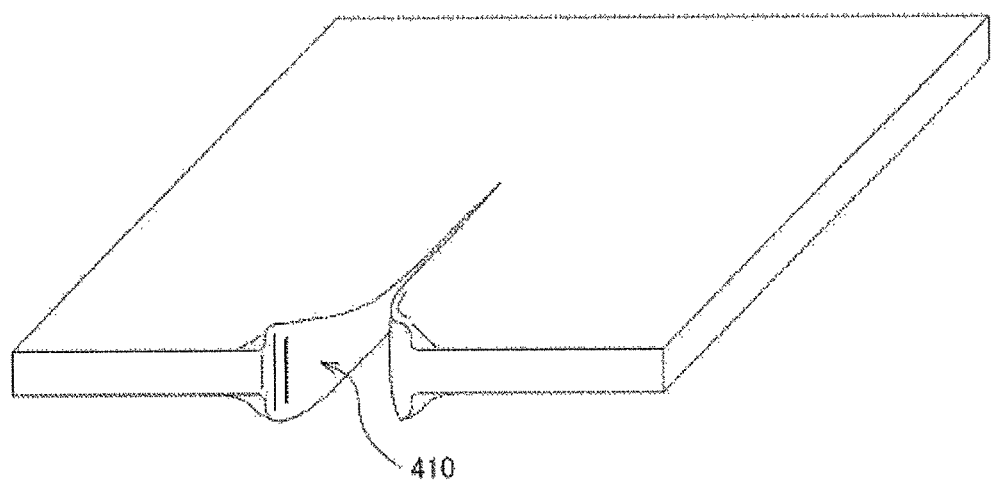

[Fig. 5C]
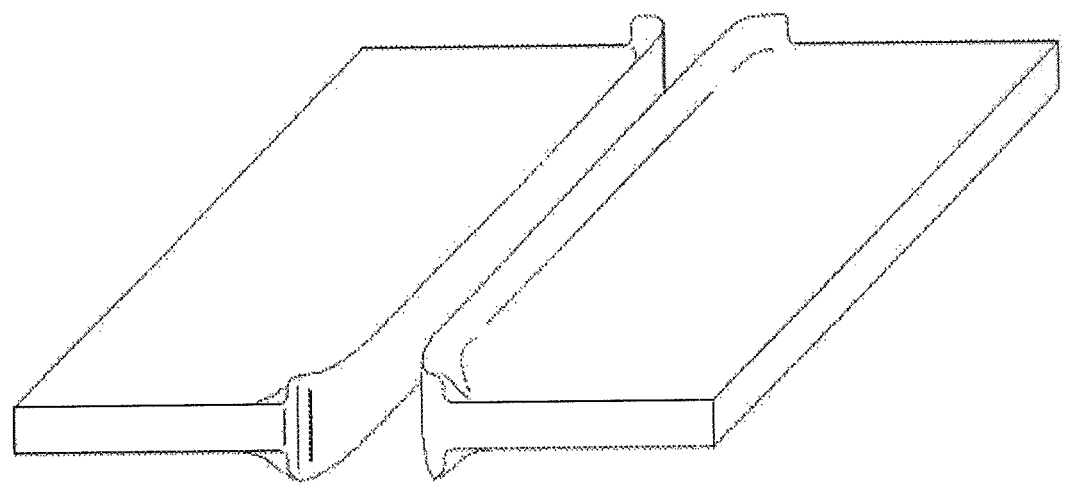
[Fig. 6A]
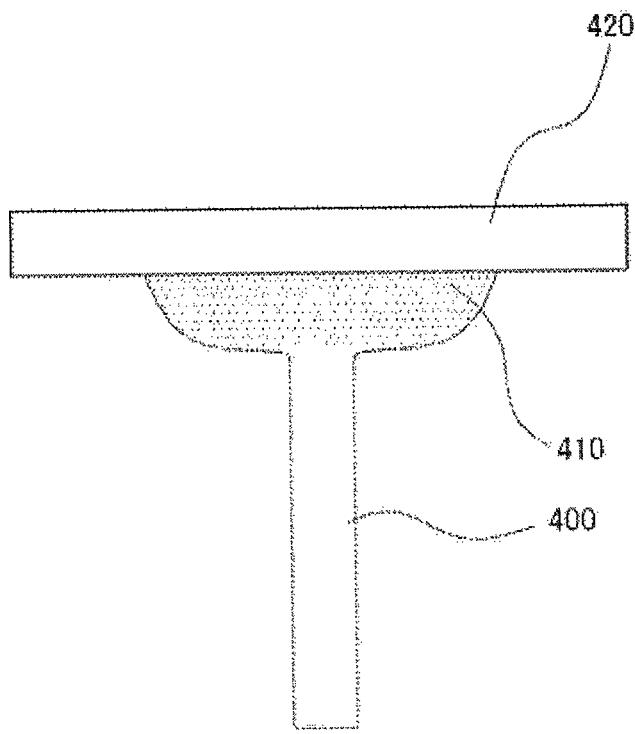

[Fig. 6B]
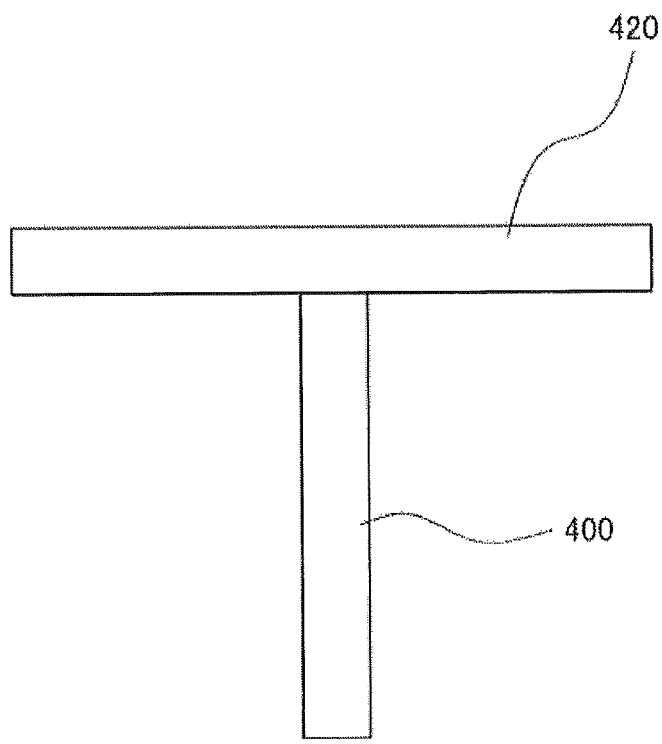
[Fig. 7A]
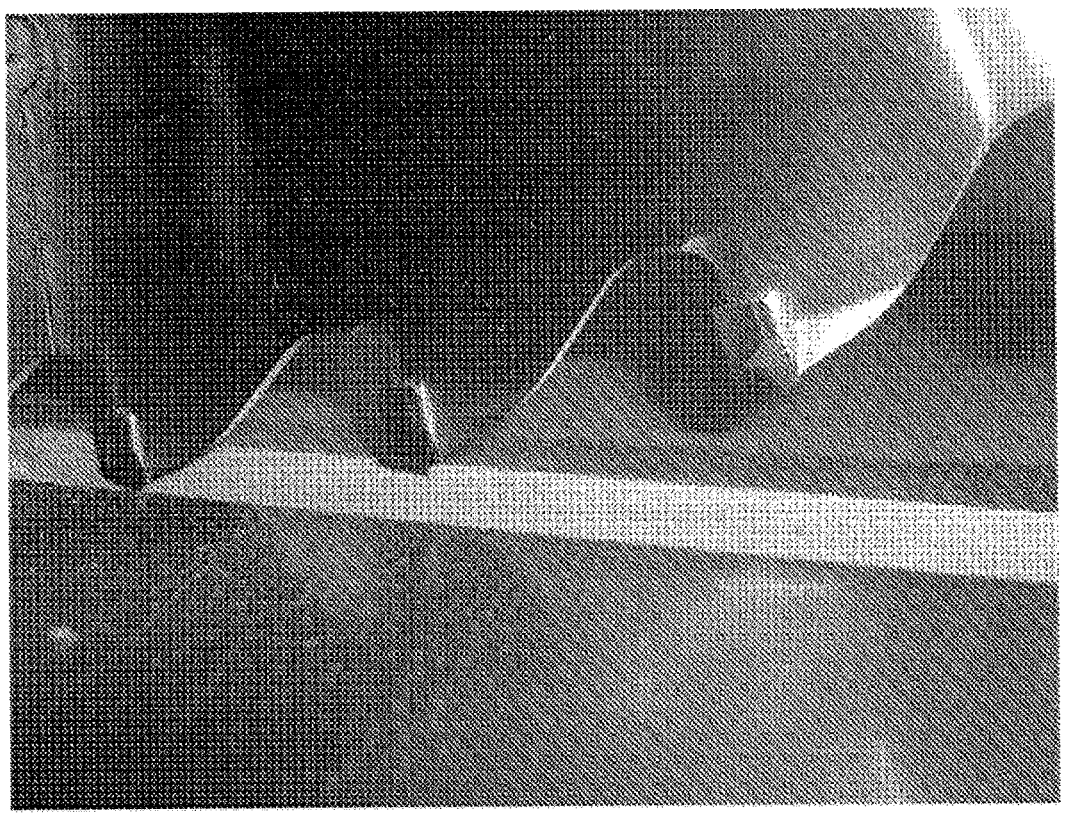

[Fig. 7B]
[Fig. 7C]
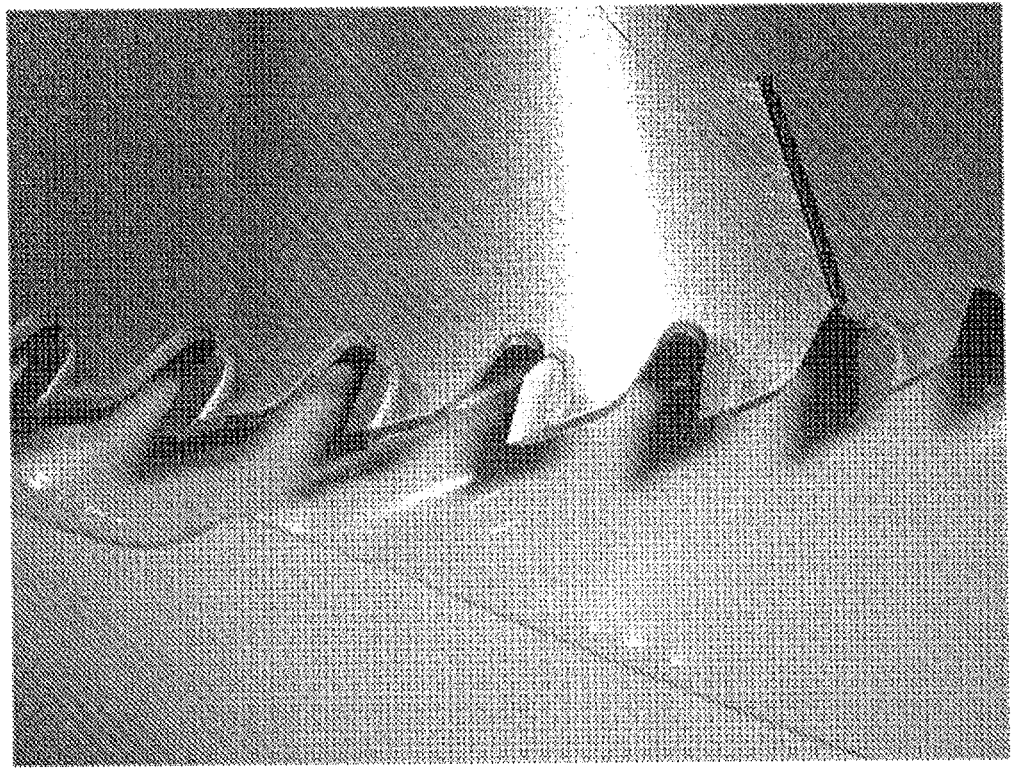

[Fig. 7D]
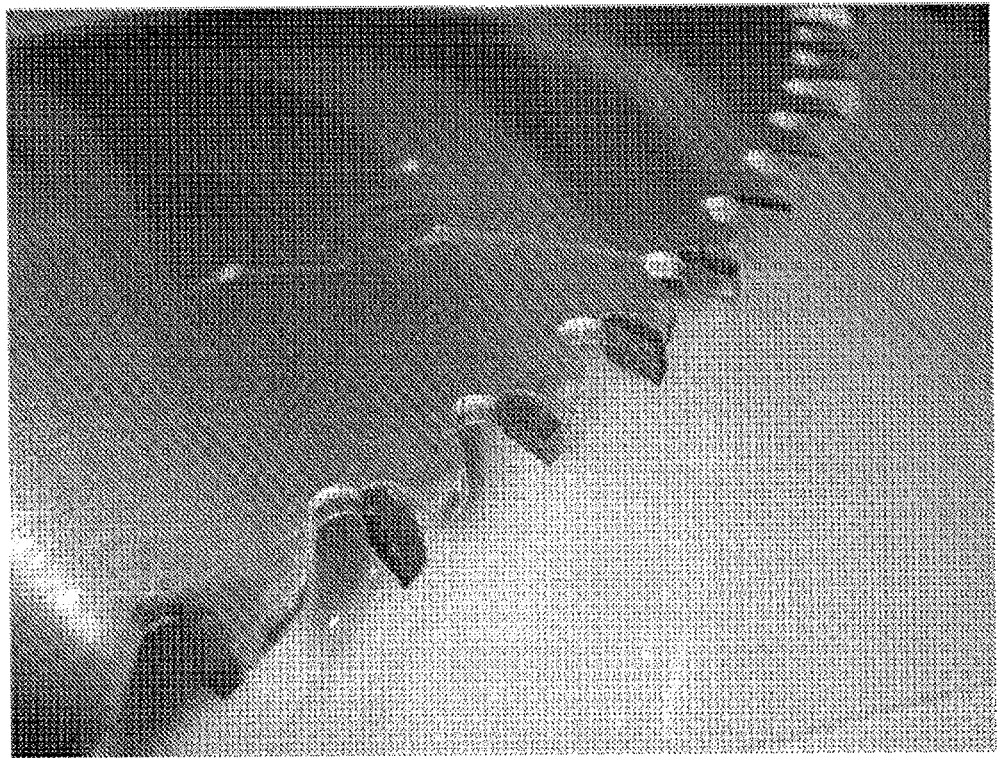
[Fig. 8A]
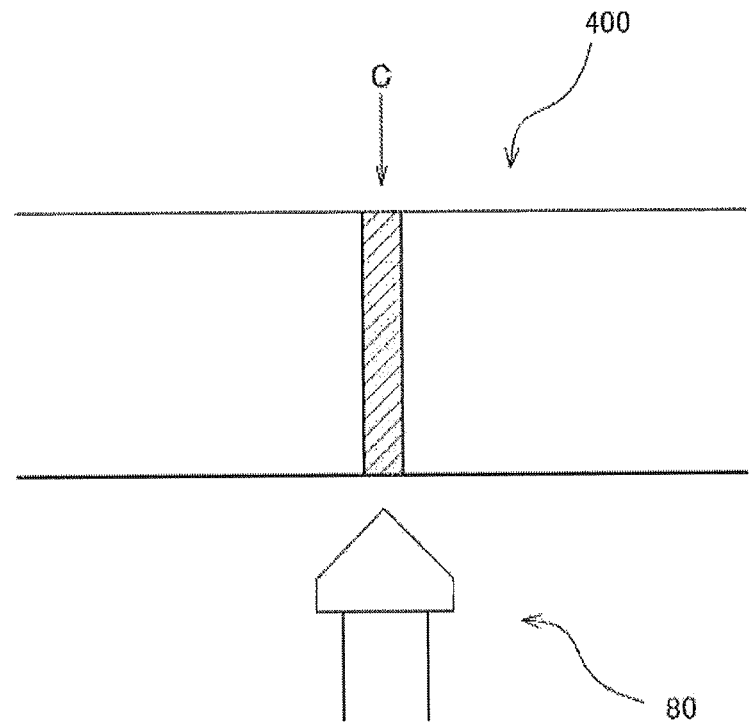

[Fig. 8B]
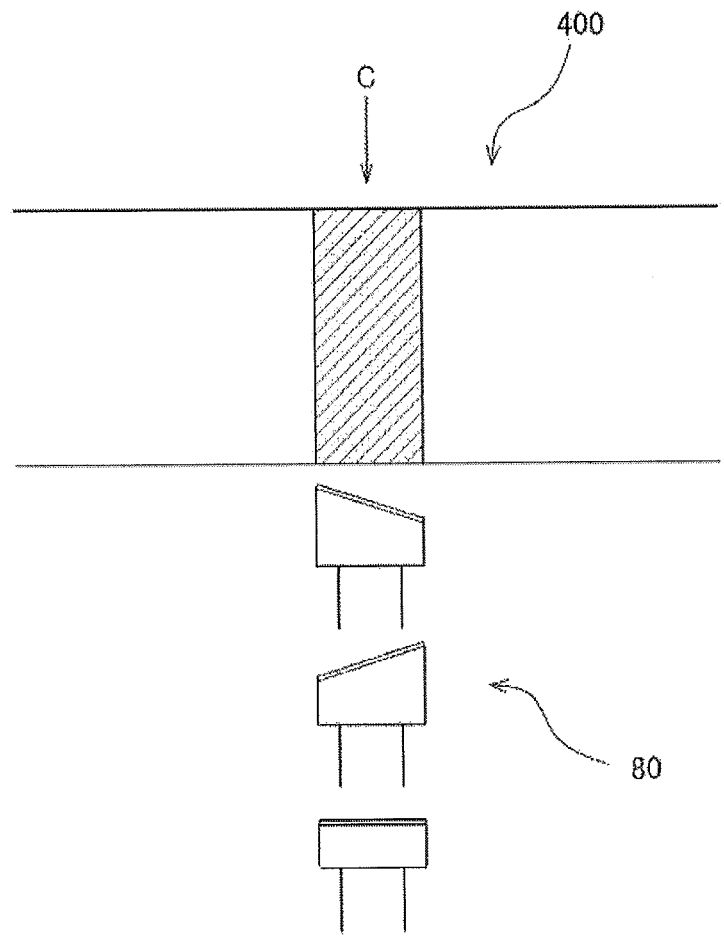
[Fig. 9A]
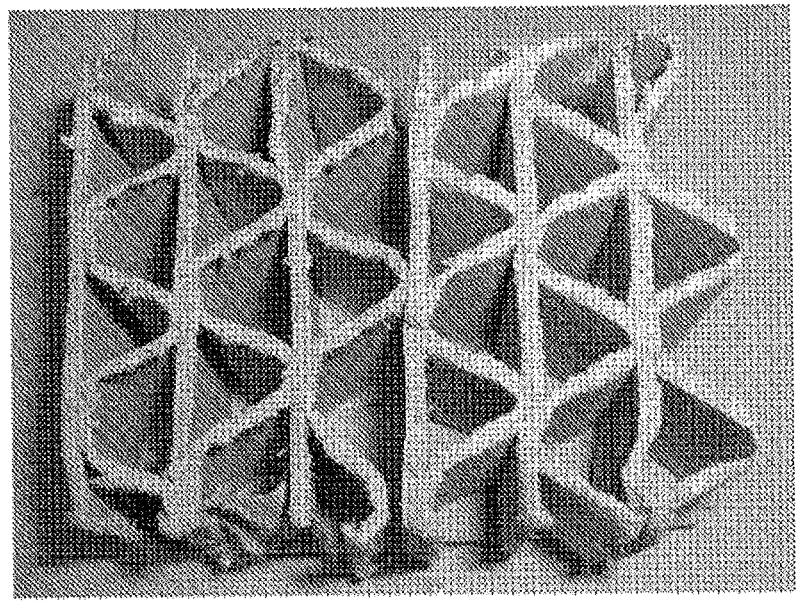

[Fig. 9B]
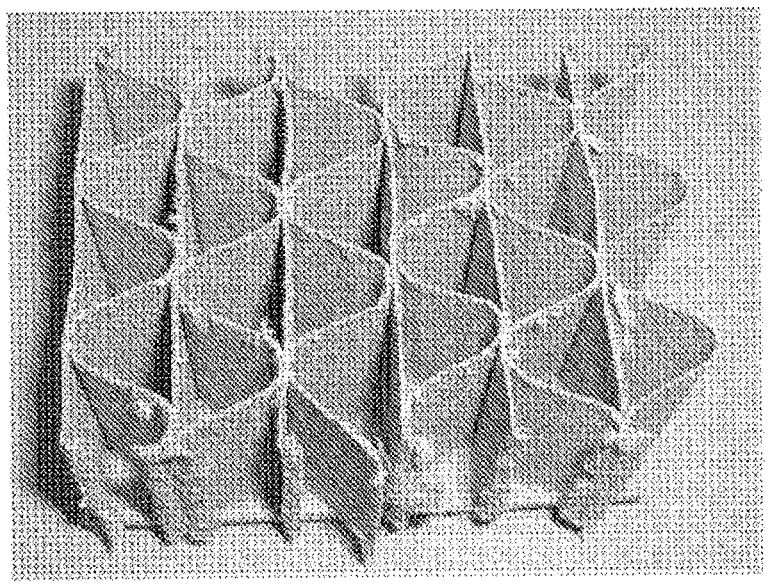
[Fig. 10A]
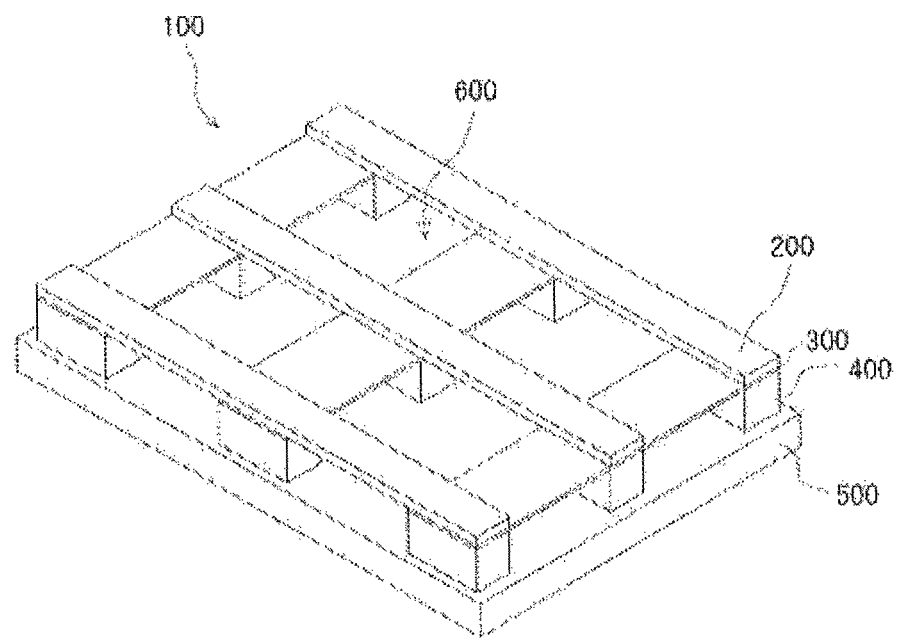

[Fig. 10B]
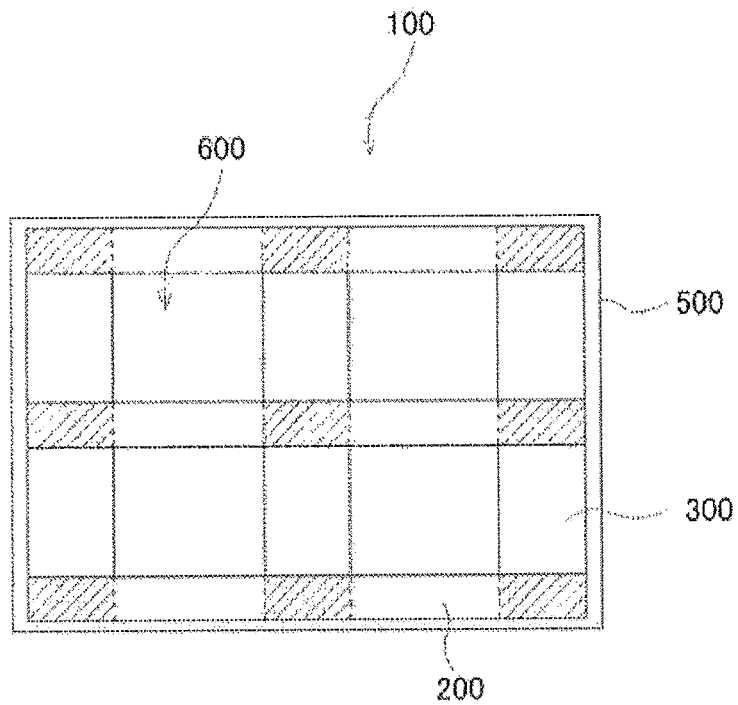
[Fig. 10C]
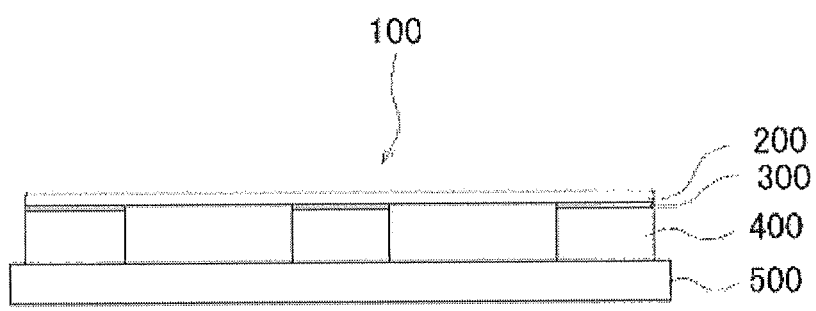
[Fig. 10D]
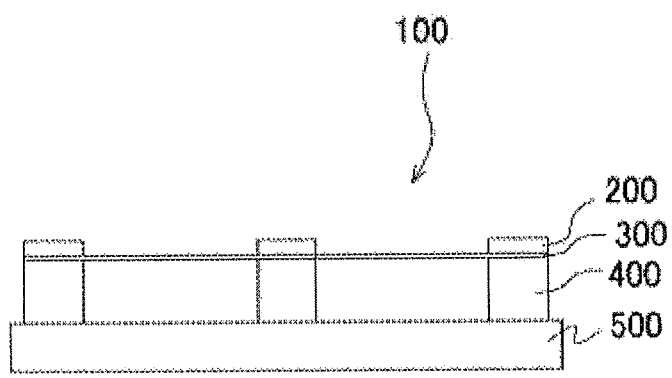

[Fig. 11A]
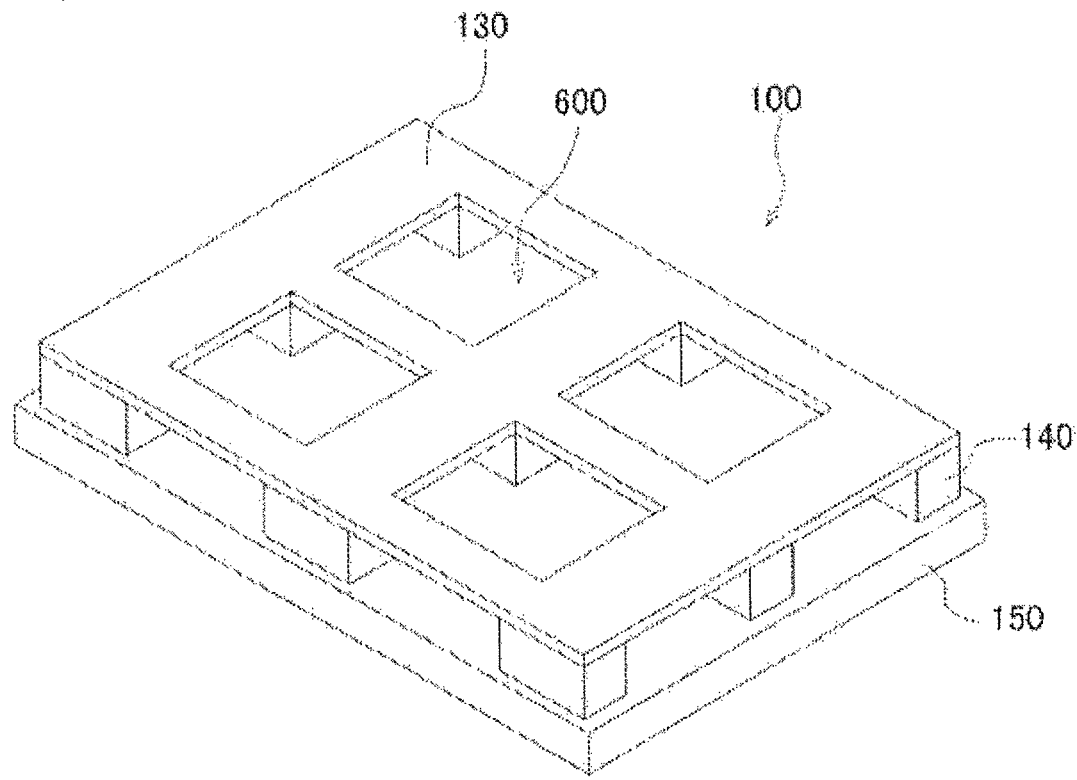
[Fig. 11B]
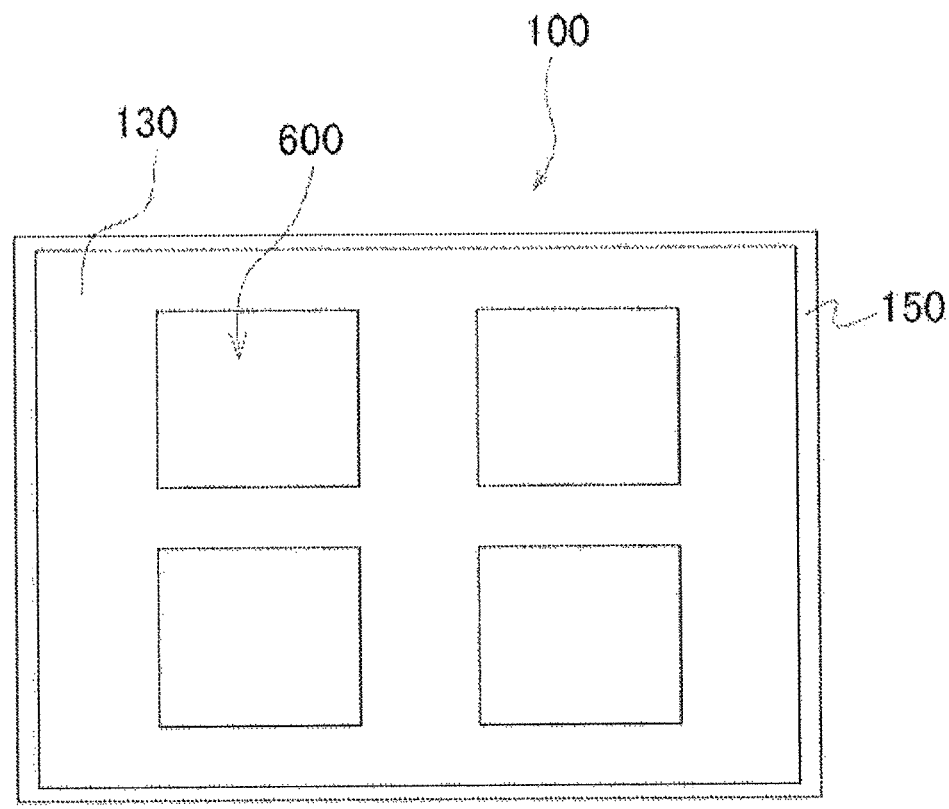

[Fig. 11C]
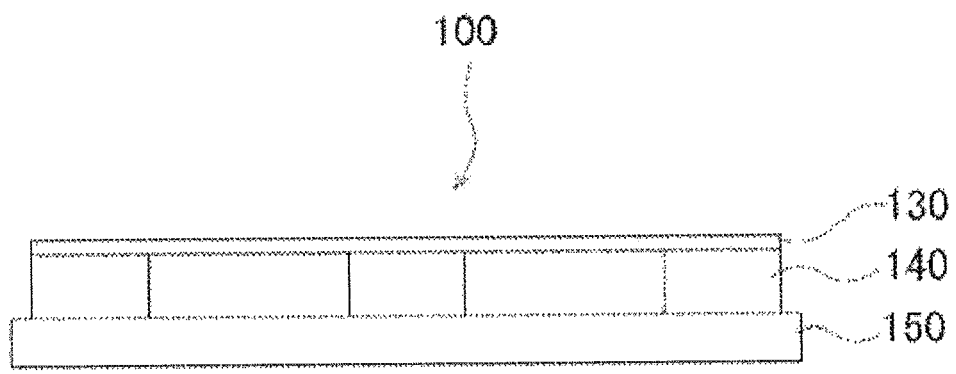
[Fig. 11D]
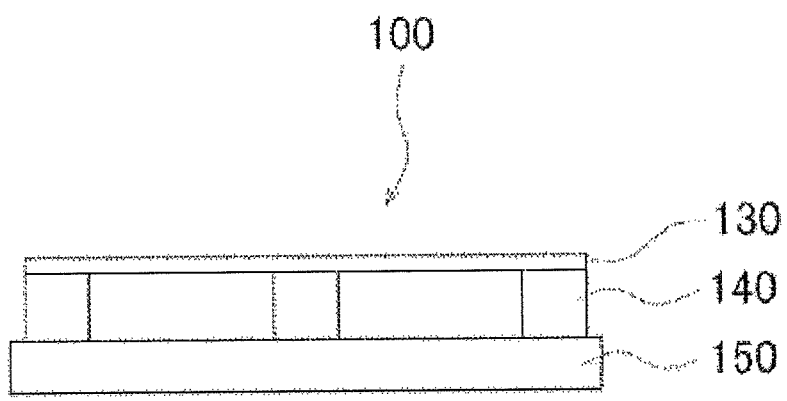

[Fig. 12A]
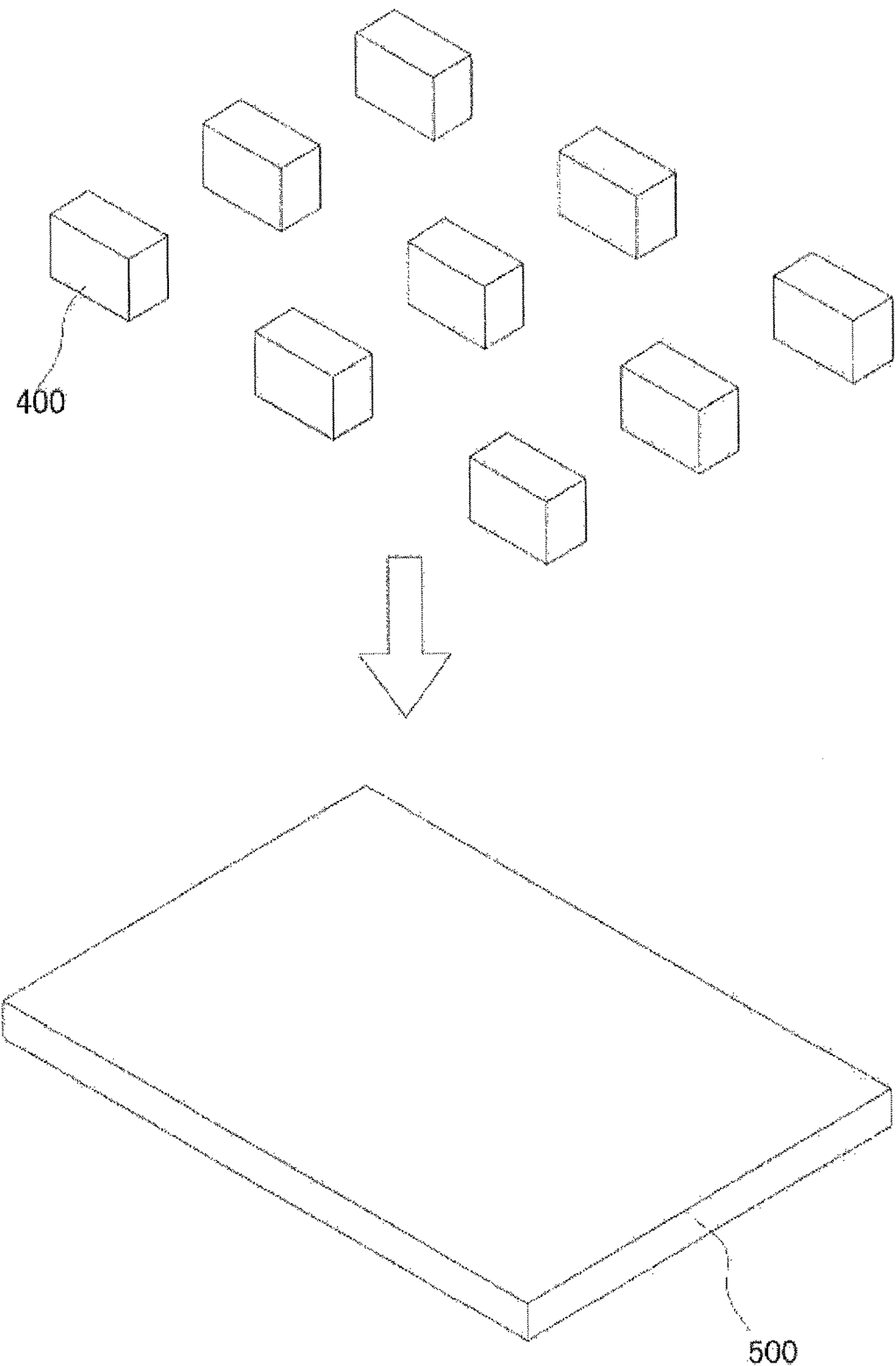

[Fig. 12B]
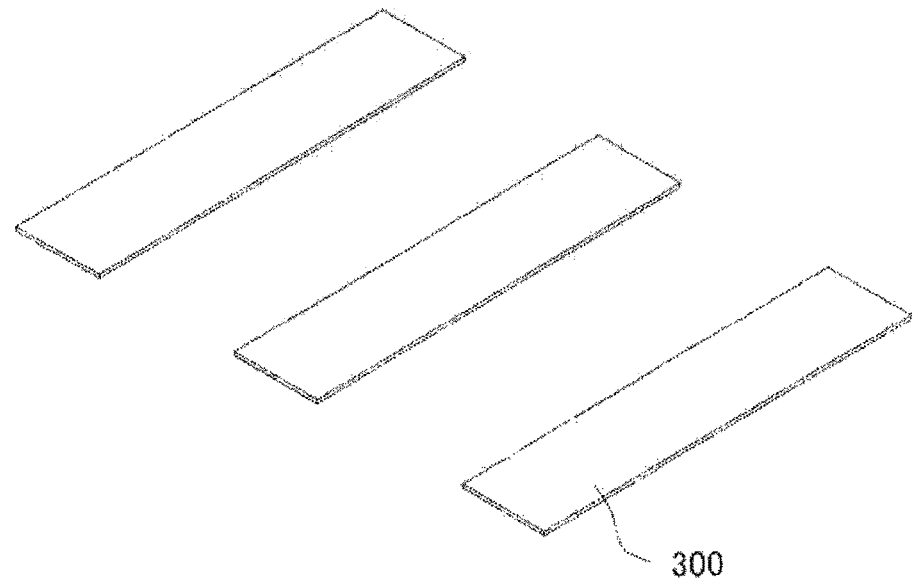
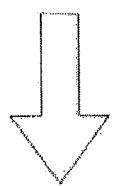
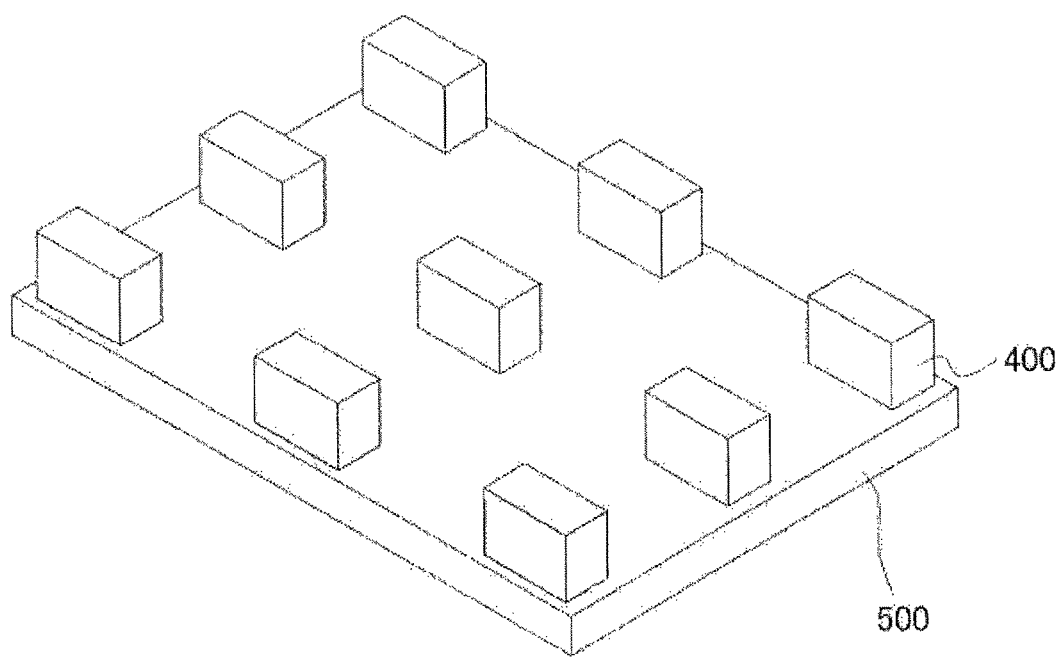

[Fig. 12C]
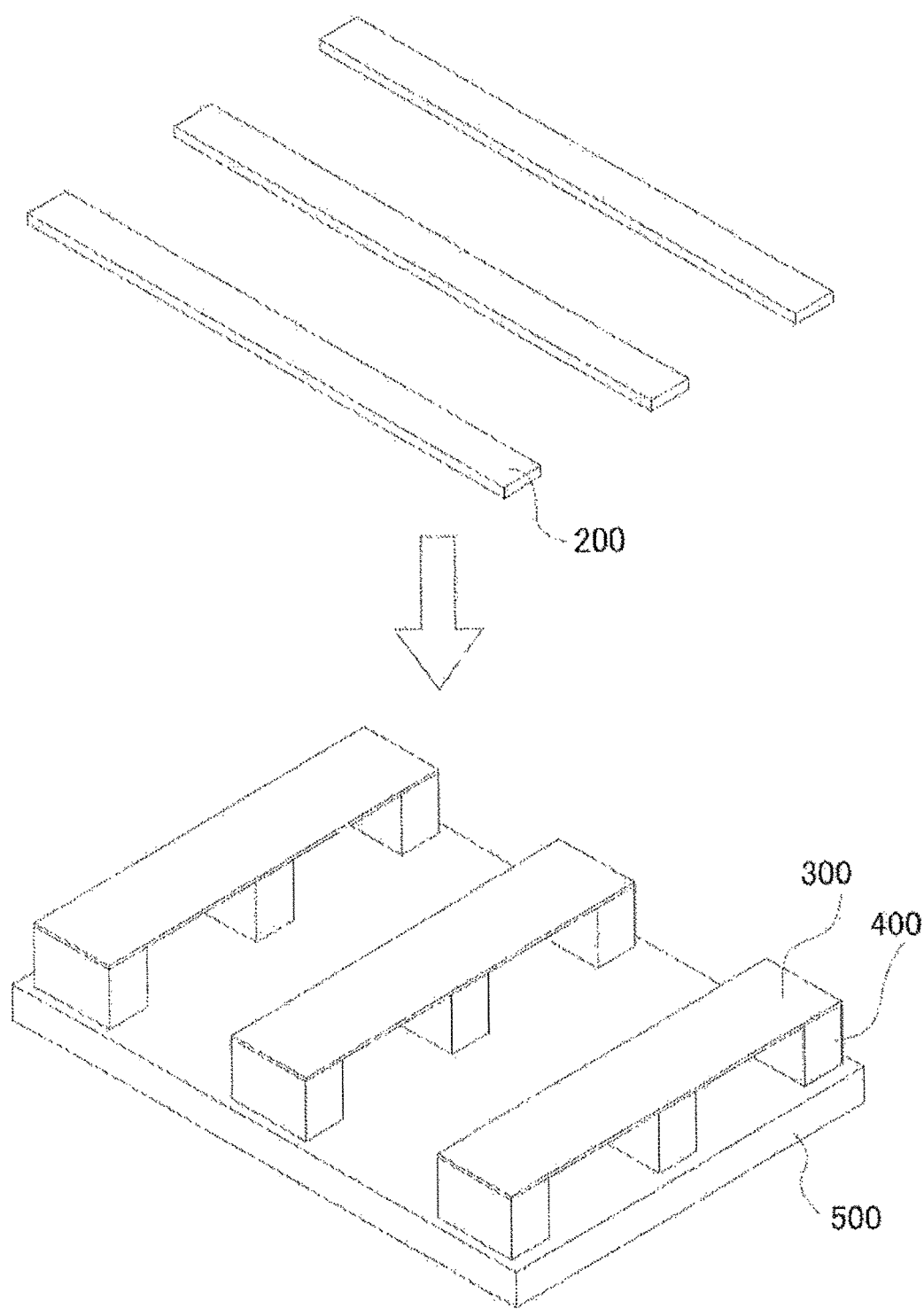

[Fig. 13A]
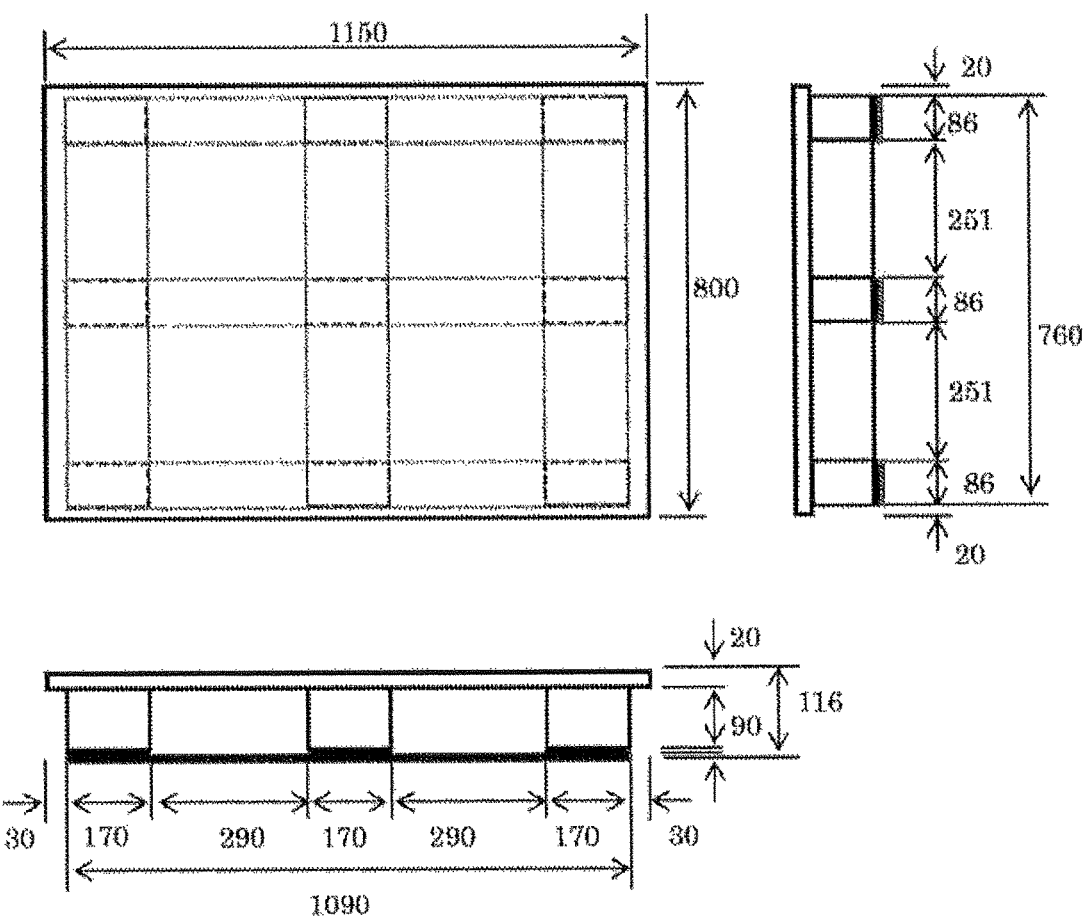

[Fig. 13B]
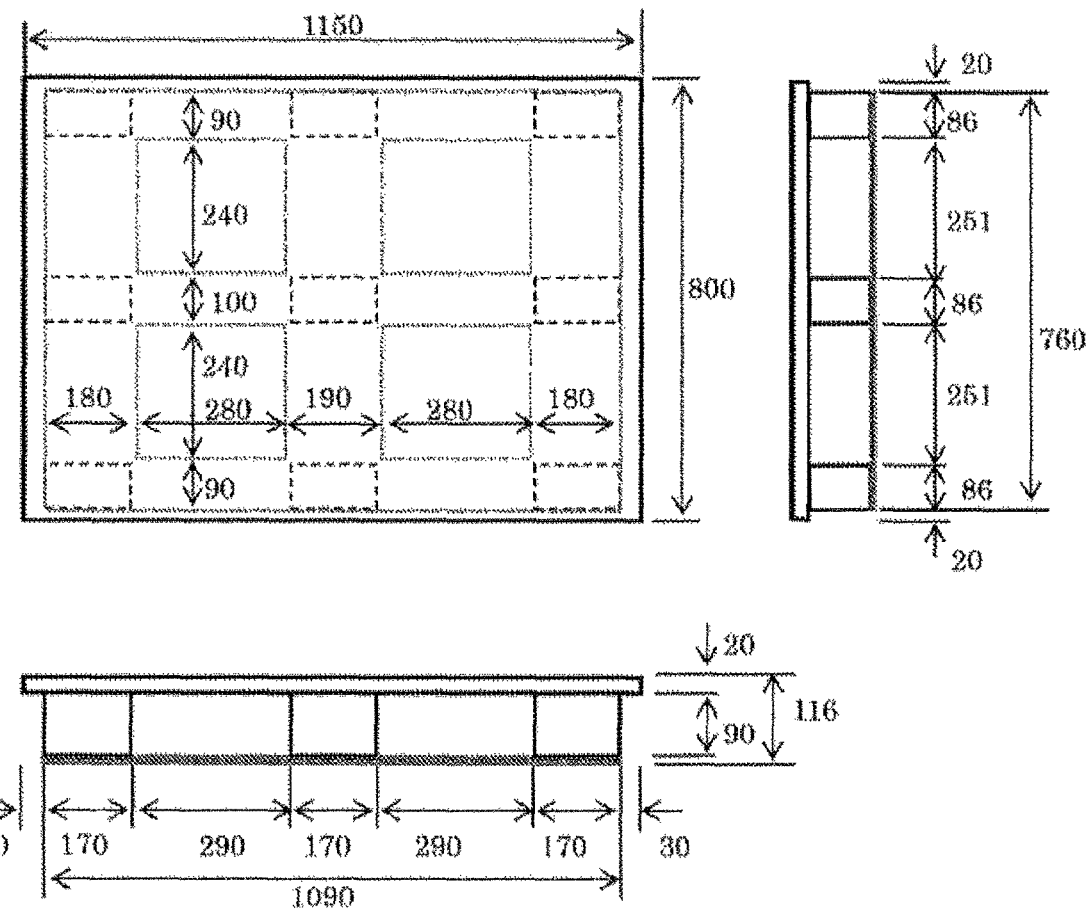

REINFORCED PAPER BOARD AND PALLET USING SAME

TECHNICAL FIELD

The present invention relates to a reinforced paper board and a method of manufacturing the same.

BACKGROUND ART

Since paper boards are lightweight and have excellent heat insulating and soundproofing properties, they have been utilized in a wide variety of applications, such as wrapping materials and core materials of furniture. Such a paper board structure has various strengths, such as anti-compression strength in the direction of board thickness, tensile strength, and flexural strength, which are enhanced by sandwiching a reinforcement core, such as a honeycomb core, inside with two paper layers.

In recent years, utilization of paper, which is a recyclable material that can reproduce raw material, has drawn significant attention as a measure to tackling environmental tissues. In particular, replacement of non-paper boards, such as Styrofoam boards, plastic boards, and wood boards, which are currently in use, with recyclable paper boards, if materialized, could be a major positive contributor to tackle environmental issues.

In particular, wood pallets and plastic pallets have been used for freight loading. However, it is difficult to recycle or dispose of wood pallets and plastic pallets. When freight loaded onto pallets is transported, disposal of pallets that are no longer needed at the destination of transportation would be costly, such that pallets are even returned in some cases.

In this regard, paper pallets have been proposed, which would be much more readily disposable, recyclable, and cheaper compared to wood or plastic. Paper pallets can be readily disposed of, compared to wood or plastic, by recycling or incinerating. Paper pallets can also be manufactured at a low cost using recycled paper.

Four-way pallets as shown in Patent Literature 1 are known as paper pallets. Patent literature 1 discloses a four-way pallet comprised of a top board, legs for forming a space for inserting a forklift arm, and a lower board for reinforcing the legs. However, pallets comprising a lower board, as shown in Patent Literature 1, cannot be carried by a hand jack with a wheel on the lower portion near the arm tip. This is because the lower board does not have a space to allow a wheel on the lower portion of a hand jack arm to project out downward.

In this regard, Patent Literature 2 discloses a pallet with an aperture formed on the lower board to allow a wheel provided on the lower portion of a hand jack arm to project out downward. In this manner, conventional four-way paper pallets that can be used with a forklift or a hand jack are characterized by having an aperture formed on the lower board, which has almost the same size as the top board (see FIG. 1B).

CITATION LIST

Patent Literature

[PTL 1] Japanese Laid-Open Publication No. 7-17543
[PTL 2] Japanese Laid-Open Publication No. 2002-370739

SUMMARY OF INVENTION

Technical Problem

However, to replace non-paper boards with paper boards, it would be necessary to further enhance the strength of paper boards without significantly raising the cost.

Further, to form an aperture on a lower board of a pallet, as disclosed above, a complex apparatus along with processing would be required, leading to increased cost. The portion cut out from a lower board as an aperture is small, such that cut out paper does not have a size that can be applied to other uses. Thus, the paper could only be disposed of or recycled, creating a large amount of waste.

Solution to Problem

In this technical field, the thickness of boards is conventionally increased to load a greater weight on paper boards or to allow the paper board to withstand a greater load. However, the volume accounted for by the board itself, with respect to the load, is high, while the efficiency of space usage is low using such a method. Thus, the inventor does not consider this method preferable. In this regard, the inventor's diligent research, in view of the aforementioned problem, resulted in the discovery that the flexural strength can be enhanced significantly in an efficient manner to a level that is comparable to that of wood boards, without significantly increasing the thickness of the entire board, by bonding an additional paperboard layer on only one side of two liner paper layers sandwiching a paper board core, to only thicken a paper layer on one side of the core. Low cost paper such as waste paper or recycled paper can be used as the additional paperboard layer, so that paper board with a strong flexural strength can be manufactured at a low cost. Further, high strength is attained without increasing the thickness, such that the paper board of the invention is particularly suitable for use as a transportation pallet for which an increase in thickness directly results in increased transportation cost.

The inventors also discovered that the flexural strength of the entire board can be efficiently enhanced by intentionally providing one of two liner paper layers sandwiching a paper board core, to which an additional paperboard layer is bonded, a weaker flexural strength than the flexural strength of the other liner paper layer. In practice, paper with a flexural strength that is only for temporary retention can be used as one of the two liner paper layers sandwiching a core. Thus, this can be manufactured at a low cost.

Further the board strength can be freely adjusted in such a paper board by the choice of the additional paperboard layer. Thus, the strength of paper boards can be freely adjusted without needing to change the equipment or settings of a production line for bonding a core and two liner paper layers sandwiching the core.

In one aspect, the present invention provides the following items.

(Item 1)

A paper board consisting of a board-like structure and a paperboard layer bonded to the board-like structure, wherein the board-like structure comprises a core and a first liner paper layer a second liner paper layer bonded to the core so as to sandwich the core, wherein the paperboard layer is bonded to the first liner paper layer, wherein a thickness of the board-like structure is about 15 mm to about 40 mm, wherein thicknesses of the first liner paper layer and the second liner paper layer are each independently about 0.5 mm to about 1.2 mm, and wherein a thickness of the paperboard layer is about 1 mm to about 4 mm.

(Item 2)

The paper board of item 1, wherein the thickness of the board-like structure is about 15 mm or greater and less than about 20 mm, and a flexural strength of the paper board is about 450 kg/m or greater.

(Item 3)

The paper board of item 1, wherein the thickness of the board-like structure is about 20 mm or greater and less than about 30 mm, and a flexural strength of the paper board is about 650 kg/m or greater.

(Item 4)

The paper board of item 1, wherein the thickness of the board-like structure is about 30 mm or greater and about 40 mm or less, and a flexural strength of the paper board is about 950 kg/m or greater.

(Item 5)

The paper board of any one of items 1 to 4, wherein the thickness of the paperboard layer is about 1 mm to about 2 mm.

(Item 6)

The paper board of any one of items 1 to 5, wherein the thickness of the paperboard layer is about 20% or less of the thickness of the board-like structure.

(Item 7)

The paper board of item 6, wherein the thickness of the paperboard layer is about 15% or less of the thickness of the board-like structure.

(Item 8)

The paper board of item 7, wherein the thickness of the paperboard layer is about 10% or less of the thickness of the board-like structure.

(Item 9)

The paper board of any one of items 1 to 8, wherein the core has a shoulder portion on a surface for bonding with the first liner paper layer or the second liner paper layer.

(Item 10)

A pallet comprising the paper board of any one of items 1 to 9.

(Item 11)

A mold comprising the paper board of any one of items 1 to 9.

(Item 12)

A method of manufacturing a paper board with a predetermined flexural strength, comprising:

bonding a core with a first liner paper layer and a second liner paper layer so that the first liner paper layer and the second liner paper layer sandwich the core to form a board-like structure of about 15 mm to about 40 mm;

selecting a paperboard layer of about 1 mm to about 4 mm in accordance with the predetermined flexural strength; and bonding the paperboard layer to a surface of the first liner paper layer;

wherein the first liner paper layer and the second liner paper layer are each independently about 0.5 mm to about 1.2 mm.

The inventors of the present application discovered that a leg reinforcing lower board with an aperture formed can thereon be formed by arranging and bonding elongate paper fragments in each of the longitudinal and transverse directions as a lower board in order to form an aperture for allowing a wheel of a hand jack to project out on a leg reinforcing lower board of a four-way pallet to complete one aspect of the invention. The pallet lower board of the invention is formed by having a plurality of elongate paper fragments in a longitudinal direction of a pallet orthogonally intersect a plurality of elongate paper fragments in a transverse direction. In addition, an approximately rectangular or square aperture is formed by two adjacent elongate paper fragments in the longitudinal direction and two adjacent elongate paper fragments in the transverse direction.

The pallet of the invention has improved strength against the peeling off of a leg compared to a pallet with a lower board having an elongate paper fragment in the longitudinal or transverse direction, by having a plurality of elongate paper fragments only in the longitudinal direction of a pallet orthogonally intersect a plurality of elongate paper fragments in the transverse direction to form the lower board. Paper pallets had a problem where a partially (to one or a small number of a plurality of legs) applied force resulted in a leg peeling off. This problem was able to be solved by having a plurality of elongate paper fragments in the longitudinal direction orthogonally intersect a plurality of elongate paper fragments in the transverse direction to form a lower board as in the pallet of the invention.

The pallet of the invention is a four-way paper pallet having a first direction and a second direction that is orthogonal to the first direction, comprising a plurality of first bottom boards extending in the first direction, a plurality of second bottom boards, which extend in the second direction and are bonded to the first bottom boards, a plurality of legs bonded to the second bottom board at a portion where the first bottom board and the second bottom board intersect, and a top board bonded to the plurality of legs.

In one embodiment of the present invention, the thickness of the first bottom boards is configured to be greater than the thickness of the second bottom boards.

In one embodiment of the present invention, the four-way pallet is configured such that the first direction is the longitudinal direction of the four-way pallet and the second direction is the transverse direction of the four-way pallet.

In one embodiment of the present invention, paper weight per area of the first bottom board is configured to be greater than the paper weight per area of the second bottom board.

In one embodiment of the present invention, the first bottom board is configured to be made of waterproofed paper.

The method of manufacturing a pallet of the invention is a method of manufacturing a four-way paper pallet having a first direction and a second direction that is orthogonal to the first direction, the pallet comprising: a plurality of first bottom boards extending in the first direction; a plurality of second bottom boards, which extend in the second direction and are bonded to the first bottom boards; a plurality of legs bonded to the second bottom boards at a portion where the first bottom board and the second bottom board intersect; and a top board bonded to the plurality of legs; wherein the method of manufacturing comprises bonding the plurality of legs to the top board, bonding the second bottom boards to the plurality of legs, and bonding the first bottom boards to the second bottom boards.

One embodiment of the present invention comprises selecting bottom boards that are thicker than the second bottom boards as the first bottom boards.

In one embodiment of the present invention, the four-way pallet is configured so that the first direction is the longitudinal direction of the four-way pallet, and the second direction is the transverse direction of the four-way pallet.

One embodiment of the present invention comprises selecting bottom boards with greater paper weight per area than that of the second bottom boards as the first bottom boards.

In one embodiment of the present invention, the first bottom boards are made of waterproofed paper.

In one embodiment of the present invention, a bond between the legs and the top board or the second bottom boards comprises cutting the legs so that a fiber density of a section obtained by cutting the legs is lower than a fiber density of the legs prior to cutting, and the section of the legs is larger than the hypothetical corresponding surface of the legs prior to cutting, and bonding the section of the legs to the top board or the second bottom boards via an adhesive.

One embodiment of the present invention is configured so that the blade tip of a cutting blade used to cut the legs forms a wedge shape, and the cutting of the legs is accomplished by the blade tip being driven to cut while advancing.

One embodiment of the present invention is configured such that the cutting blade cuts the legs while pushing open the legs to both sides of the blade tip.

Advantageous Effects of Invention

According to the present invention, the flexural strength of a paper board can be significantly enhanced to a level that is comparable to that of wood boards. Non-paper boards, such as Styrofoam boards, plastic boards, and wood boards, can be replaced with recyclable paper boards with the present invention. Thus, the present invention could be a major positive contributor to tackle environmental issues.

In particular, a paper board provided by the present invention can achieve a flexural strength that is comparable to that of wood boards, as discussed above, at a low cost. For example, such a paper board is suitable for use as a pallet or as a material used for transportation.

In addition, the entirety of the paper board of the invention is recyclable. Thus, the paper board could be a major positive contributor to environmental issues by reducing the usage of wood resources.

The paper board of the invention can achieve high strength without increasing the thickness. Thus, the paper board of the invention is suitable for use as a transportation pallet that is required to have a high load capacity or as a mold that is required to have resistance to high load. The paper board is particularly suited to use as a transportation pallet. This is because paper products generally have a large volume with respect to weight, with transport cost accounting for a high percentage of the unit price of products, so that reduction in the thickness (volume) of paper boards would directly lead to decreased transportation cost.

Compared to, for example, paper boards using cardboard, which is also made of paper, instead of an additional paperboard layer, the paper board of the invention can achieve a high flexural strength in any direction without variability of flexural strengths depending on the direction and/or a small decrease in the flexural strength due to humidity (structurally, cardboard has a significantly different strength against bending between long and short grains). The paper board of the invention is also suitable for use especially in transportation pallets in view of these characteristics.

In addition, the lower board of the four-way pallet of the invention is formed by combining elongate paper fragments in the longitudinal and transverse directions. Thus, compared to conventional techniques of forming a lower board with a single sheet of paper and cutting open and forming an aperture thereon, the present invention enables manufacture of a four-way pallet with a strength equivalent to conventional four-way pallets without wasting paper and without requiring complex apparatuses and processing. The four-way pallet of the invention can be manufactured at a low cost, despite having a strength equivalent to conventional four-way pallets.

Furthermore, the lower board of the four-way pallet of the invention can suppress moisture absorption into the pallet by a plurality of elongate paper fragments extending in the longitudinal or transverse direction, forming a surface that is in contact with the ground. In conventional four-way pallets, the entire lower board constitutes the surface in contact with the ground, as a single sheet of paper constitutes the lower board. However, paper constituting a pallet is highly moisture absorbent. Thus, when the surface in contact with the ground is wet or moist, a lower board constituting the surface in contact with the ground absorbs moisture, thus impairing the strength of the pallet. Only a plurality of paper fragments extending in either the longitudinal or transverse direction are in contact with the ground in the lower board of the invention, so that the surface in contact with the ground can be reduced relative to conventional techniques to suppress moisture absorption. Further, paper constituting the surface in contact with the ground, in particular, may be subjected to waterproofing. Since paper subjected to such waterproofing can be limited to only the plurality of paper fragments extending in either the longitudinal or transverse direction, a pallet can be manufactured at a low cost.

In addition, in one embodiment of the present invention, the thickness of paper fragments constituting the surface in contact with the ground (paper fragments extending in either the longitudinal or transverse direction), among elongate paper fragments in the longitudinal and transverse directions that constitute the pallet lower board of the invention, can be increased to maintain sufficient space to the paper fragments that do not constitute the surface in contact with the ground from the surface in contact with the ground. Moisture absorption into a pallet can be suppressed thereby. Furthermore, paper fragments constituting the surface in contact with the ground can be paper fragments extending along the longitudinal direction of the pallet, and the paper weight per area of the paper fragments can be increased to efficiently enhance the strength of the entire pallet. For pallets, a force applied to the longitudinal side is large while the force applied to the transverse side is small when using a forklift or a hand jack. Thus, it is necessary to reinforce the longitudinal side in particular in order to enhance the strength of the entire pallet. Conventional techniques that form a lower board from a single sheet of paper required an increase in paper weight per area on the entire lower board in order to enhance the strength of the entire pallet, but it is only necessary to increase the paper weight per area of paper fragment extending in the longitudinal direction, thus leading to reduced cost in the present invention.

The pallet of the invention has enhanced strength against legs peeling off compared to a pallet with a lower board having elongate paper fragments only in the longitudinal or transverse direction, by having elongate paper fragment in the longitudinal direction of the pallet orthogonally intersect a plurality of elongate paper fragments in the transverse direction to form a lower board. Paper pallets had a problem where partially (to one or a small number of a plurality of legs) applied force resulted in a leg peeling off. The problem was able to be solved by having a plurality of elongate paper fragments in the longitudinal direction orthogonally intersect a plurality of elongate paper fragments in the transverse direction to form a lower board, as in the pallet of the invention.

BRIEF DESCRIPTION OF DRAWINGS

FIG. 1A is a perspective view of the paper board of the invention.

FIG. 1B is a front view of the paper board of the invention.

FIG. 2A is a perspective view of the surface of a core while being exposed by removing a portion of a first paper layer and a third paper layer of the paper board of the invention.

FIG. 2B is a perspective view of the surface of an alternative core while being exposed by removing a portion of a first paper layer and a third paper layer of the paper board of the invention.

FIG. 3A shows a process of providing a paper laminate in a manufacturing process of the paper board of the invention.

FIG. 3B shows a process of cutting a paper laminate to form a core in a manufacturing process of the paper board of the invention.

FIG. 3C shows a process of sandwich-like bonding of a core with a first paper layer and a second paper layer in a manufacturing process of the paper board of the invention.

FIG. 3D shows a process of bonding a paper layer 3 to a paper layer 1 in a manufacturing process of the paper board of the invention.

FIG. 4 is a schematic diagram showing the bend testing in the Examples.

FIG. 5A shows the outward appearance of a core constituent member formed by a preferred cutting method.

FIG. 5B shows the state of cutting a core constituent member formed by a preferred cutting method.

FIG. 5C shows the state after cutting a core constituent member formed by a preferred cutting method.

FIG. 6A shows the state of bonding a liner layer and a section of a core constituent member formed by a preferred cutting method.

FIG. 6B shows a state of bonding of a liner layer and a section of a core constituent member formed by a common cutting method.

FIG. 7A shows an example of a cutting blade that can be used in a preferred cutting method.

FIG. 7B shows an example of a cutting blade that can be used in a preferred cutting method.

FIG. 7C is a side view showing an example of a common cutting blade.

FIG. 7D is a perspective view showing an example of a common cutting blade.

FIG. 8A is a schematic diagram showing the cut of a core constituent member by a preferred cutting method.

FIG. 8B is a schematic diagram showing a cut of a core constituent member by a common cutting blade.

FIG. 9A shows the state of a section of a core constituent member formed by a preferred cutting method.

FIG. 9B shows the state of a section of a core constituent member, which is the subject cut by a common cutting blade.

FIG. 10A is a bottom surface side perspective view of the four-way pallet of the invention.

FIG. 10B is a bottom view of the four-way pallet of the invention.

FIG. 10C is a front view of the four-way pallet of the invention, with the bottom surface side up.

FIG. 10D is a side view of the four-way pallet of the invention, with the bottom surface side up.

FIG. 11A is a bottom surface side perspective view of a conventional four-way pallet.

FIG. 11B is a bottom view of a conventional four-way pallet.

FIG. 11C is a front view of a conventional four-way pallet, with the bottom surface side up.

FIG. 11D is a side view of a conventional four-way pallet, with the bottom surface side up.

FIGS. 12A-C are diagrams showing a representative manufacturing method of the four-way pallet of the invention.

FIGS. 12A-C are diagrams showing a representative manufacturing method of the four-way pallet of the invention.

FIGS. 12A-C are diagrams showing a representative manufacturing method of the four-way pallet of the invention.

FIG. 13A shows the dimensions of the pallet in Examples 8 and 9.

FIG. 13B shows the dimensions of the pallet in the Comparative Example (units in mm).

DESCRIPTION OF EMBODIMENTS

The present invention is explained hereinafter with exemplary Examples, while referring to the attached drawings. Throughout the entire specification, a singular expression should be understood as encompassing the concept thereof in the plural form, unless specifically noted otherwise. Further, the terms used herein should be understood to be used in the meaning that is commonly used in the art, unless specifically noted otherwise. Thus, unless defined otherwise, all terminologies and scientific technical terms that are used herein have the same meaning as the general understanding of those skilled in the art to which the present invention pertains. In the case of a contradiction, the present specification (including the definitions) takes precedence.

According to the present invention, a flexural strength of the entire board can be efficiently and significantly enhanced to the level comparable to that of a wood board, by bonding an additional paperboard layer on only one side of two liner paper layers sandwiching a paper board core to thicken only a paper layer on one side of the core. Low cost paper, such as waste paper or recycled paper, can be used as the additional paperboard layer, so that a paper board with a strong flexural strength can be manufactured at a low cost.

Accordingly to the present invention, high strength can be achieved without increasing the thickness of a paper board. Specifically, a flexural strength that could not be achieved previously can be achieved by simply bonding a paperboard layer of about 1 mm to 4 mm to a core sandwiched between two liner paper layers with a thickness of about 15 mm to 40 mm. The inventor unexpectedly materialized a paper board that can withstand a load of 400 kg or greater, which could not be achieved previously, with a board thickness of, for example about 15 to 20 mm, by the present invention.

According to the present invention, a flexural strength of a paper board structure can be efficiently and significantly enhanced without significantly raising the cost. More specifically, a flexural strength of the entire board structure can be efficiently and significantly enhanced by intentionally providing one of two paper layers sandwiching a core of a paper board structure, to which an additional paper layer is bonded, a smaller paper weight per area than the paper weight per area of the other paper layer. In practice, paper with a flexural strength that is only for temporary retention can be used as one of the two paper layers sandwiching a core. Thus, this can be manufactured at a low cost.

The present invention provides a four-way paper pallet having a first direction and a second direction that is orthogonal to the first direction, comprising: a plurality of first bottom boards extending in the first direction; a plurality of second bottom boards, which extend in the second direction and are bonded to the first bottom boards; a plurality of legs bonded to the second bottom board at a portion where the first bottom board and the second bottom board intersect; and a top board bonded to the plurality of legs.

The pallet of the present invention has a lower board consisting of first elongate bottom boards and second elongate bottom boards, so that paper wasted in forming the lower board can be reduced compared to conventional pallets formed with a lower board constituted of a single sheet of paper. Further, the step of cutting out and forming an aperture on a single sheet of paper for a hand jack wheel requires specialized equipment, which is costly. Meanwhile, the present invention can contain cost since such a step is no longer required.

In the pallet of the invention, only the first bottom board is in contact with the ground, while the second bottom board is not in contact with the ground. The surface in contact with the ground of the pallet can be reduced and moisture from the surface in contact with the ground into the main part of the pallet can be suppressed thereby. In one embodiment of the present invention, sufficient space from the ground to the second bottom board can be secured by increasing the thickness of the first bottom board.

In another embodiment of the present invention, further reinforcement of the entire pallet can be efficiently achieved by providing the above-described first bottom board with greater paper weight per area than that of the above-described second bottom board.

The pallet of the invention has enhanced strength against legs peeling off compared to a pallet with a lower board having elongate paper fragments only in the longitudinal or transverse direction, by having a plurality of elongate paper fragments in the longitudinal direction of the pallet orthogonally intersect a plurality of elongate paper fragments in the transverse direction to form a lower board. Paper pallets had a problem where partially (to one or small number of a plurality of legs) applied force resulted in a leg peeling off. The problem was able to be solved by having a plurality of elongate paper fragments in the longitudinal direction orthogonally intersect a plurality of elongate paper fragments in the transverse direction to form a lower board, as in the pallet of the invention.

Definition

As used herein, "paper" is used in the common meaning thereof, and refers to any material prepared by dispersing plant fiber in water, which is made thin on a flat surface, and is dehydrated and dried.

As used herein, "core" refers to any structure providing a flexural strength to a paper board structure.

As used herein, "cardboard" refers to a paper member prepared by pasting a liner onto one or both sides of corrugated middle core paper wherein a space formed by the center core paper and the liner extends in the direction of the plane of the liner. Examples of "cardboard" include, but are not limited to, single faced cardboards produced by pasting a liner onto one surface of center core paper, double face cardboards produced by pasting a liner onto the flute tips of center core paper of a single face cardboard, double wall cardboards produced by pasting a center core portion of a single face cardboard onto one side of a double face cardboard, triple-wall cardboards produced by further pasting a center core portion of a single face cardboard onto one side of a double wall cardboard, and the like.

As used herein, "short grain" of a cardboard refers to a direction that is substantially parallel to the direction toward which a space formed by a liner and center core paper of the cardboard extend, and "long grain" of a cardboard refers to a direct that is substantially perpendicular to the direction towards which a space formed by a liner and center core paper of the cardboard extends.

As used herein, "board-like structure" refers to a structure formed by sandwiching a core inside with two liner paper layers, wherein a space formed by the core and the two liner paper layers extend in the direction of the thickness of the structure. Thus, it should be noted that the board-like structure in the present invention is clearly different from cardboards with a space formed by center core paper and liners extending in the direction of the plane of the liners.

As used herein, "paper board" refers to a paper structure with an additional paperboard layer provided to the aforementioned board-like structure.

As used herein, "paper weight per area" refers to the weight of paper per 1 $m^2$.

As used herein, "rollable" refers to being capable of being rolled onto a core with a diameter of about 110 mm with a paper roller. "Rollable" paper in the present invention can be common rolled paper, which is available as a product in a rolled form. More specifically, "rollable" paper in the present invention can be paper that can be in a rolled form with a thickness of about 1.2 mm or less As used herein, "unrollable" refers to being incapable of being rolled with a paper roller due to a non-removable curl that is imparted when rolled with a paper roller. "Unrollable" paper in the present invention can be common planographic paper, which is available as a product in a sheet form. More specifically, "unrollable" paper in the present invention can be paper that cannot be rolled in a rolled form with a thickness of about 1.0 mm or greater.

As used herein, a "liner paper layer" or "liner paper" refers to a paper layer sandwiching a core. A liner paper layer herein does not comprise a substantial space inside. Thus, a liner paper layer herein does not encompass cardboards. In a certain embodiment, a liner paper layer refers to paper of about 0.5 mm to about 1.2 mm. In a preferred embodiment, a liner paper layer refers to rollable paper of about 0.5 mm to about 1.2 mm.

As used herein, "paperboard layer" or "paperboard" refers to a paper layer added to a board formed by sandwiching a core inside with at least two liner paper layers. A paperboard layer herein does not comprise a substantial space inside. Thus, a paperboard layer herein does not encompass cardboards. In a certain embodiment, a paperboard layer refers to paper of about 1 mm to about 4 mm. In a preferred embodiment, a paperboard layer refers to unrollable paper of about 1 mm to about 4 mm.

As used herein, "flexural strength" of a board refers to a value measured by a single point concentrated load in a 400 mm span at a rate of 10 mm/min, converted into a value of uniformly distributed load in units of 1 m (kg/m). The distance of 400 mm is a common distance between two forklift arms. Conversion from single point concentration load to uniformly distributed load is achieved by doubling the measurement value in single point concentrated load.

As used herein, "shoulder portion" refers to a region formed at a section of paper that has been cut by a cutting blade with a wedge-shaped blade tip, wherein the fiber density has changed from that before cutting due to cutting. A section of paper that has been cut by a wedge-shaped blade tip of a cutting blade has fibers spread so that the fiber density is smaller and the area is larger.

As used herein, "pallet" refers to a loading platform used for transportation or distribution.

As used herein "four-way" refers to being able to insert a forklift or hand jack arm from all four directions in a square or rectangular pallet. A pallet that can only have a forklift or hand jack arm inserted from two opposing directions in a square or rectangular pallet is referred to as a "two-way" pallet.

As used herein, "fiber density" of paper refers to the amount of fiber per a certain volume. Thus, a high fiber density in a certain region refers to the dense presence of fiber in the region. In contrast, a low fiber density in a certain region refers to the loose and sparse presence of fiber in the region.

As used herein, "fiber density of a section" refers to the fiber density in a region of a surface newly created by cutting a paper member or the vicinity thereof with a changed fiber density of paper due to cutting. It should be noted that the fiber density of a section is not necessarily limited to fiber density of only the surface.

As used herein, "area of a section" refers to the area of a surface newly created by cutting a paper member.

As used herein, "hypothetical corresponding surface" prior to cutting, for a section, refers to a hypothetical section on a paper member prior to cutting at the location on the surface created by cutting the paper member.

As used herein, "substantially planar" does not refer to a completely flat surface. The surface may be somewhat warped.

As used herein, "about" refers to within ±10% of the subsequently described numerical value.

Disclosure of Preferred Embodiments

The embodiments provided hereinafter are provided to better facilitate the understanding of the present invention, so that the scope of the present invention should not be limited by the following description. Thus, it is apparent to those skilled in the art that the descriptions herein can be referred to in order to make appropriate modifications within the scope of the present invention.

As shown in FIG. 1A (perspective view of the paper board of the invention) and FIG. 1B (front view of the paper board of the invention), a paper board 10 of the invention is a board comprised of three paper layers (first liner paper layer 1, second liner paper layer 2, and third paperboard layer 3) and a core 4. Each of the liner paper layer 1 and the liner paper layer 2 is bonded to the core 4 so that the liner paper layer 1 and the liner paper layer 2 sandwich the core 4. The third paperboard layer 3 is bonded to the surface of the liner paper layer 1 (surface on the opposite side of the surface bonded to the core 4).

In a representative preferred embodiment, the paper board 10 of the invention can be manufactured by sandwich-like bonding of the liner paper layer 1 and the liner paper layer 2 to the core 4, by bonding the liner paper layer 1 to one of the surfaces of the core 4, and by bonding the liner paper layer 2 to the other surface of the core 4 while pulling out the liner paper layer 1 from a roll of the liner paper layer 1 rolled up into a rolled form, and by pulling out the liner paper layer 2 from the other roll of the liner paper layer 2 rolled up into a rolled form. In this embodiment, both the liner paper layer 1 and the liner paper layer 2 thus need to be a rollable rolled paper product.

In one embodiment, the present invention is characterized in that a flexural strength of a board can be enhanced to a level that is comparable to a wood board, by further reinforcing a structure produced by sandwiching the core 4 with the liner paper layer 1 and the liner paper layer 2 with the paperboard layer 3. More specifically, when the paperboard layer 3 is bonded to the layer paper layer 1 for example, each paper layer is selected so that the sum of paper weight per area of the liner paper layer 1 and the paper weight per area of the paperboard layer 3 is greater than the paper weight per area of the liner paper layer 2. Low cost paper, such as waste paper or recycled paper, can be used as the additional paperboard layer 3, so that the cost would be low.

In one embodiment, the present invention is characterized in that a flexural strength can be efficiently enhanced without significantly increasing the thickness of the entire board, by further enhancing a structure produced by sandwiching the core 4 with the liner paper layers 1 and 2 with the paperboard layer 3. Thus, the paper board of the invention can materialize high load capacity and/or high load resistance without the board itself having a large volume. Further, a cardboard is not used in the liner paper layers or the paperboard layer in the paper board of the invention. Thus, a flexural strength of the board has no directional variability and/or has small decrease in flexural strength due to humidity. In view of these characteristics, the paper board of the present invention is suitable for use as a pallet or a mold, and is especially suitable for use as a pallet for which an increased thickness of the board itself directly results in increased transportation cost. While FIG. 1A, FIG. 1B and other drawings illustrate an embodiment with the liner paper layer 1 that is thinner than the liner paper layer 2, the present invention is not limited thereto. The liner paper layer 1 and the liner paper layer 2 may have the same thickness, or the liner paper layer 1 may be thicker than the liner paper layer 2.

In one embodiment, the present invention is further characterized by the use of paper (preferably rollable paper) with paper weight per area that is lower than the paper weight per area of the liner paper layer 2 as the liner paper layer 1. The inventors intended to enhance the flexural strength of the entire paper board 10 by reinforcing a structure produced by sandwiching a core with two paper layers with the additional paperboard layer 3 as disclosed above, but the inventors unexpectedly discovered that the improvement in flexural strength of the paper board 10 due to bonding of the paperboard layer 3 was dramatically enhanced by intentionally providing, at this time, the liner paper layer 1 with smaller, instead of the same, paper weight per area compared to the paper weight per area of the liner paper layer 2 (see especially Table 2 in the following Examples). Since paper with low paper weight per area may be used as the liner paper layer 1, cost can be reduced compared to cases that use paper with the same level of paper weight per area as the liner paper layer 2. Paper with lower paper weight per area is generally cheaper in this field. In practice, paper with paper weight per area that is only for temporary retention can be used as the liner paper layer 1. Thus, this can be manufactured at a low cost. Generally, there is no reason to consider giving more or less paper weight per area to the liner paper layer 1 and the liner paper layer 2 in order to enhance the flexural strength of the paper board 10, such that those skilled in the art should naturally give the same level of paper weight per area for the liner paper layer 1 and the liner paper layer 2. Thus, the discovery of the inventors was completely unexpected. Paper with low paper weight per area and/or thin paper can be used as the liner paper layer 1 to increase the manufacturing rate of a board structure to achieve improved productivity.

Paper with any thickness and paper weight per area can be selected as the liner paper layer 1 in accordance with the application, under the condition that the sum of the paper weight per area of the liner paper layer 1 and the paper weight per area of the paperboard layer 3 is greater than the paper weight per area of the liner paper layer 2. In a preferred embodiment, the paper weight per area of the liner paper layer 1 is lower than the paper weight per area of the liner paper layer 2. For example, the paper weight per area of the liner paper layer 1 is about 210 g/m$^2$ to about 900 g/m$^2$, and preferably about 500 g/m$^2$ to about 700 g/m$^2$. Generally when paper layers are of the same material, the paper weight per area of paper layers is dependent on the thickness. Thus, the thickness of the liner paper layer 1 can be thinner than the thickness of the liner paper layer 2. In general, paper products have a large volume with respect to weight, with transportation cost accounting for a high percentage of the unit price of the product. Thus, thin paper can be used as the liner paper layer 1 to lower the cost of transport by further reducing the thickness (volume) of paper boards. The thickness of the liner paper layer 1 is, for example, about 0.3 mm to about 1.2 mm, more preferably about 0.7 mm to about 1.2 mm, and preferably about 0.7 mm to about 1.0 mm. In a preferred embodiment with the paper weight per area of the liner paper layer 1 lower than the paper weight per area of the liner paper layer 2, the liner paper layer 1 may have a strength for only temporary retention for fixedly securing the structure of the core 4. In general, the paper weight per area is 0.25 mm=about 180 g/m$^2$.

Paper with any thickness and paper weight per area can be selected as the liner paper layer 2 in accordance with the application, under the condition that the sum of the paper weight per area of the liner paper layer 1 and the paper weight per area of the paperboard layer 3 is greater than the paper weight per area of the liner paper layer 2. In a preferred embodiment, the paper weight per area of the liner paper layer 2 is higher than the paper weight per area of the liner paper layer 1. For example, the paper weight per area of the liner paper layer 2 is about 210 g/m$^2$ to about 900 g/m$^2$, and preferably about 500 g/m$^2$ to about 700 g/m$^2$. Further, the thickness of the liner paper layer 2 is, for example, about 0.3 mm to about 1.2 mm and preferably about 0.5 mm to about 1.0 mm.

Both the liner paper layer 1 and the liner paper layer 2 are preferably a rollable rolled paper product. Examples of paper that can be used as the liner paper layers include paper for a center core (representative paper weight per area of 120 g/m$^2$ to 160 g/m$^2$) and paper for paper tubes (representative paper weight per area of 400 g/m$^2$ to 800 g/m$^2$)

The paperboard layer 3 is bonded to the surface of the liner paper layer 1 concurrently with, or subsequent to, bonding each of the liner paper layer 1 and the liner paper layer 2 to the core 4. In a preferred embodiment, the paperboard layer 3 is bonded after bonding the liner paper layer 1 and the liner paper layer 2 to the core 4 using a roller. Thus, the paperboard layer 3 does not need to be rollable paper. Unrollable paper, typically planographic paper, can be used, and certainly cut rollable paper can also be used. In this manner, the paperboard layer 3 can be rollable or unrollable, such that a variety of paper can be used. Thus, used planographic paper or waste paper can be used to reduce manufacturing cost of the paper board 10. In a preferred embodiment, the thickness of the paperboard layer 3 is about 1 mm to about 4 mm. Examples of the paperboard layer 3 include paper for paper tubes with a thickness of about 1 mm (representative paper weight per area of 700 g/m$^2$) and paper produced by pasting together 2 to 4 sheets of such paper. Paper produced by pasting together 4 sheets of paper with paper weight per area of 700 g/m$^2$ would have paper weight per area of about 3150 g/m$^2$, including the weight of glue for pasting. The paper layer 3 may be comprised of a single layer of paper or multiple layers of paper.

The thickness of the board-like structure of the invention (liner paper layers 1 and 2 and core 4) is about 15 mm to about 40 mm, more preferably about 15 mm to about 30 mm, and more preferably about 20 mm to about 30 mm. The inventor has unexpectedly discovered that flexural strength can be significantly increased without significantly increasing the thickness of the entire board by additionally providing a paperboard layer of about 1 mm to about 4 mm to a board-like structure in this range.

In a representative embodiment, the paper weight per area of a layer consisting of the liner paper layer 1 bonded to the paperboard layer 3 is higher than the paper weight per area of the liner paper layer 2. In a preferred embodiment, the liner paper layer 1 and the liner paper layer 2 are paper with identical thickness and/or paper weight per area.

The paper board 10 of the invention may be used with the paperboard layer 3 on top or the paperboard layer 3 on the bottom. When weight is loaded on the paperboard layer 3 side of the paper board 10, a compression force is applied on the paperboard layer 3 side, and a tensile strength is applied to the liner paper layer 2 side on the opposite side. Meanwhile, the liner paper layer 1 and the paperboard layer 3 oppose the compression force to impart a strong flexural strength on the paper board 10. Further, when a weight is loaded on the liner paper layer 2 side of the paper board 10, a compression force is applied on the liner paper layer 2 side and a tensile strength is applied on the paperboard layer 3 side on the opposite side. Meanwhile, the liner paper layer 1 and the paperboard layer 3 opposite the tensile strength to impart a strong flexural strength on the paper board 10.

In a preferred embodiment, the paper board of the invention is used as a transportation pallet. When a paper board is used as a transportation pallet, a subject to be transported may be supported on the liner paper layer 2 side, or on the paperboard layer 3 side. Although not intended to limit the present invention, when a subject that would load a concentrated weight to a portion of a paper board is transported, it is preferable to support the subject with the paperboard layer 3 side on top. When a subject that would load the weight equally on almost the entire surface of a paper board is handled, it is generally preferable to support the subject with the liner paper layer 2, with the paperboard layer 3 side on the bottom, because a flexural load thereof applies a compression force on the bottom side.

In general, a large flexural strength is required on the bottom side of a board of a pallet (side held by forklift claws) for transportation pallets. Thus, when the paper board structure of the invention is used as a transportation pallet, the paperboard layer 3 can placed on the bottom side (side held by forklift claws) to efficiently use the structure as a transportation pallet with a desired flexural strength.

FIGS. 2A and 2B show specific structures of the core 4 used in the paper board 10 of the invention. FIG. 2A is a perspective view of the surface of a core while being exposed by removing a portion of the liner paper layer and the paperboard layer of the paper board of the invention. FIG. 2A shows the most preferred core structure of the invention. In FIG. 2A, the core 4 is formed by aligning, in a flat shape, a plurality of core units 23 comprised of a paper core material 21 shaped so that a number of, for example, sinusoidal wave shapes are aligned, and a paper liner 22 attached to the curved convex portion thereof on one side.

The shape of the core material 21 may be a V shape, a U shape, a trapezoidal shape, or a wave shape, as disclosed above. Alternatively, as shown in FIG. 2B, the core 4 may have a honeycomb shape forming numerous hexagonal prisms 24.

A flexural strength of the paper board 10 is greater for a height H of the core 4 that is higher. The height H of the core 4 can be suitably determined by those skilled in the art in accordance with the application of the paper board 10. Typically, the height is determined so that the thickness of the board-like structure is about 15 to about 40 mm, and typically about 20 mm, about 30 mm, or about 40 mm.

The paper weight per area of the paper forming the core 4 can be suitably determined by those skilled in the art in accordance with the application, but it is, for example, about 160 g/m$^2$ to about 280 g/m$^2$.

In FIG. 3, a representative method of manufacturing the paper board 10 is explained. First, a paper laminate 40 with a height greater than the final height H of the core 4 is made (FIG. 3A). This laminate 40 is cut to have the thickness of the height H to form the core 4 (FIG. 3B), and the core 4 is bonded while being sandwiched by the liner paper layers 1 and 2 (FIG. 3C). Next, the paperboard layer 3 is bonded to the surface of the liner paper layer 1 (FIG. 3D) to obtain the paper board 10 of the invention.

The paper board 10 can be of any size in accordance with the application. Examples thereof include, but are not limited to 1100 mm×1100 mm, 800 mm×1000 mm, 1000 mm×1200 mm, and the like. The paper board 10 may be molded into a desirable size after sandwiching the core 4 with the liner paper layers 1 and 2 and before bonding the paperboard layer 3 (i.e., the state of FIG. 3C) or after bonding the paperboard layer 3 to the liner paper layer 1 (i.e., the state of FIG. 3D).

In the present invention, an adhesive for bonding may be any paper adhesive. Those skilled in the art can readily select a suitable adhesive for the manufacture of the paper board 10 of the invention. A representative cardboard adhesive is a starch adhesive. Components thereof include starch, alkali (e.g., caustic soda), a boron compound (e.g., borax), water, and the like.

The present invention provides a paper board-like structure with a flexural strength that is comparable to wood boards with a flexural strength that is strengthened by reinforcement with the paper layer 3. Since a variety of paper (e.g., waste paper) can be selected as the paperboard layer 3, low-cost paper can be used. Thus, cost would not significant increase by the reinforcement with the paperboard layer 3. Furthermore, the final resulting paper board structure has a strength that is comparable to wood boards while the structure is made of paper such that the board can be completely recycled after use. Thus, the paper board structure positively contributes to environmental issues.

The strength of a paper board structure can be freely adjusted in accordance with the application or designated strength by selecting the type of paperboard layer 3. The strength of paper boards were previously adjusted by changing the strength of the liner paper layers 1 and 2 or the structure of the core 4, especially and mainly by changing the actual size of the core. However, change in the strength of the liner paper layers 1 and 2 or the structure of the core 4 requires changing each equipment and settings thereof in the automated production line each time. This was labor-intensive and resulted in lost productivity for each change, such that this was a large burden on manufacturers. Meanwhile, the strength can be freely adjusted by only changing the type of paperboard layer 3 bonded to the liner paper layer 1 in the present invention. Thus, not much change is required in each equipment and settings thereof in the production line in accordance with the strength. This enables the manufacturer to manufacture paper boards with various strengths without labor to change the equipment and settings for each strength of paper boards. For example, a paper board with a desired flexural strength can be very easily provided by preparing multiple types of waste paper as the paperboard layer 3, selecting waste paper with suitable paper weight per area or thickness that can achieve the desired flexural strength therefrom in accordance with the application, and bonding the selected paperboard layer 3 to the liner paper layer 1 side of the core sandwiched by the liner paper layers 1 and 2.

In addition, paper with low paper weight per area can intentionally be used as the liner paper layer 1 in the paper board of the invention in order to use low cost paper as the liner paper layer 1. Further, the rate of manufacturing a board structure can be increased in order to achieve enhanced productivity by using paper with low paper weight per area and/or thin paper as the liner paper layer 1.

Thickness and Flexural Strength of Board

The present invention is representatively characterized by significantly increasing the flexural strength without significantly increasing the thickness of a board. As is apparent by referring to data in Table 4 shown below, when a flexural strength of for example 1000 kg/m is required, a paper board with a strength that can withstand such a weight load is currently provided by preparing a 60 mm board-like structure (see flexural strength of 1144 kg/m for board-like structure of 60 mm and no paperboard in Table 4) or by overlaying and pasting together two board-like structures (e.g., pasting together two 30 mm board-like structures, or pasting a 20 mm board-like structure and a 30 mm board-like structure). However, the thermal efficiency for thermal adhesion of liner paper layers to a core upon manufacture deteriorates as the thickness of a board-like structure becomes thicker. Further, a manufacturing process of a structure produced by overlaying two or more board-like structures is complicated. In addition, such a structure is inefficient in terms of producing paper waste, as paper is only used for two liner paper layers on the two pasted surfaces. However, according to the present invention, a flexural strength of 1298 kg/m is achieved by bonding a 1 mm paperboard to a 30 mm board-like structure (see 30 mm board-like structure and 1 mm paperboard in Table 4), such that a flexural strength of 1000 kg can be achieved with a board thickness of 31 mm. It should be noted that a thickness of 60 mm is currently required, whereas the present invention achieves the same or greater level of strength with about half the thickness. For example, a flexural strength that has been achieved by a board-like structure with a thickness of 40 mm to 60 mm or by pasting together two 30 mm board-like structures in the past could only be achieved by combining a board-like structure with a thickness of 30 mm and a paperboard of about 1 to 4 mm.

In one embodiment of the present invention, the thickness of a board-like structure is about 15 to 40 mm, and the thickness of an additional paperboard layer is about 1 mm to about 4 mm. In a preferred embodiment, the thickness of a paperboard layer is about 1 mm to about 3 mm. In a more preferred embodiment, the thickness of a paperboard layer is about 1 mm to about 2 mm.

In one embodiment, the present invention achieves a flexural strength of 450 kg/m with a smaller thickness compared to that of conventional boards. Specifically, the present invention provides a paper board produced by bonding a paperboard of about 1 mm to 4 mm to a board-like structure of about 15 mm or greater and less than 20 mm, with a flexural strength of about 450 kg/m or greater. In a more preferred embodiment, the present invention provides a paper board produced by bonding a paperboard of about 1 mm to about 4 mm to a board-like structure of about 15 mm or greater and less than 20 mm, with a flexural strength of about 500 kg/m or greater. In a more preferred embodiment, the present invention provides a paper board produced by bonding a paperboard of about 1 mm to about 4 mm to a board-like structure of about 15 mm or greater and less than 20 mm, with a flexural strength of about 550 kg/m or greater. For example, according to the research and development of the inventor up to this point, a board with a flexural strength of 550 kg/m can sufficiently withstand a load of 400 kg.

In another embodiment, the present invention achieves a flexural strength of 650 kg/m with a smaller thickness compared to that of conventional boards. Specifically, the present invention provides a paper board produced by bonding a paperboard of about 1 mm to 4 mm to a board-like structure of about 20 mm or greater and less than 30 mm, with a flexural strength of about 650 kg/m or greater. In a more preferred embodiment, the present invention provides a paper board produced by bonding a paperboard of about 1 mm to about 4 mm to a board-like structure of about 20 mm or greater and less than 30 mm, with a flexural strength of about 700 kg/m or greater. In a more preferred embodiment, the present invention provides a paper board produced by bonding a paperboard of about 1 mm to about 4 mm to a board-like structure of about 20 mm or greater and less than 30 mm, with a flexural strength of about 750 kg/m or greater. For example, according to the research and development of the inventor up to this point, a board with a flexural strength of 700 kg/m can sufficiently withstand a load of 500 kg.

In another embodiment, the present invention achieves a flexural strength of 950 kg/m with a smaller thickness compared to that of conventional boards. Specifically, the present invention provides a paper board produced by bonding a paperboard of about 1 mm to 4 mm to a board-like structure of about 30 mm or greater and 40 mm or less, with a flexural strength of about 950 kg/m or greater. In a more preferred embodiment, the present invention provides a paper board produced by bonding a paperboard of about 1 mm to about 4 mm to a board-like structure of about 30 mm or greater and 40 mm or less, with a flexural strength of about 1000 kg/m or greater. In a more preferred embodiment, the present invention provides a paper board produced by bonding a paperboard of about 1 mm to about 4 mm to a board-like structure of about 30 mm or greater and 40 mm or less, with a flexural strength of about 1100 kg/m or greater. For example, according to the research and development of the inventor up to this point, a board with a flexural strength of 950 kg/m can sufficiently withstand a load of 700 kg.

In another embodiment, the present invention achieves a flexural strength of 950 kg/m with a smaller thickness compared to that of conventional boards. Specifically, the present invention provides a paper board produced by bonding a paperboard of about 1 mm to 4 mm to a board-like structure of about 30 mm or greater and less than 40 mm, with a flexural strength of about 950 kg/m or greater. In a more preferred embodiment, the present invention provides a paper board produced by bonding a paperboard of about 1 mm to about 4 mm to a board-like structure of about 30 mm or greater and less than 40 mm, with a flexural strength of about 1000 kg/m or greater. In a more preferred embodiment, the present invention provides a paper board produced by bonding a paperboard of about 1 mm to about 4 mm to a board-like structure of about 30 mm or greater and less than 40 mm, with a flexural strength of about 1100 kg/m or greater.

In a preferred embodiment, the thickness of an additional paperboard layer is about 20% or less of the thickness of a board-like structure. In a more preferred embodiment, the thickness of an additional paperboard layer is about 15% or less of the thickness of a board-like structure. In a further preferred embodiment, the thickness of an additional paperboard layer is about 10% or less of the thickness of a board-like structure. In a further preferred embodiment, the thickness of an additional paperboard layer is about 5% or less of the thickness of a board-like structure.

Application

The paper board of the invention can be used in place of a wood board in various applications that use a wood board. Examples of such applications of the paper board of the invention include, but are not limited to, pallets, molds, and the like.

*Pallets

The paper board of the invention is especially suitable for use as a transportation pallet. This is because paper products generally have a large volume with respect to weight, with transportation cost accounting for a high percentage of the unit price of a product, such that reduction of the thickness (volume) of paper boards would directly lead to decreased transportation cost.

For example, compared to a paper board using a cardboard instead of an additional paperboard layer, the paper board of the invention could achieve a high flexural strength in any direction without variability in flexural strengths depending on the direction which is structurally unavoidable when using a cardboard, and/or a small decrease in flexural strength due to humidity. The paper board of the invention is also suitable for use as a transportation pallet in view of these characteristics.

In fact, when the paper board of the invention is used as a transportation pallet to transport a product, the recipient of the product can readily dispose of and recycle the paper board used as the transportation pallet. Since disposal of wood is more labor intensive and difficult compared to paper, when a wood board is used as a transportation pallet, a recipient of a product cannot readily dispose of the pallet, such that the pallet was returned in some cases. Thus, efficient one-way transportation, which could not be accomplished in transportation using a wood board, is accomplished by using the paper board of the invention.

*Mold

An embodiment applying the paper board of the invention as a mold, such as a concrete mold, is explained.

It is preferable that the entire surface of a paper board is subjected to waterproofing. Preferred waterproofing methods include a method of deaerating a bag-like resin film (vinyl) while a board is inserted in the bag to coat a board surface with a resin film. However, the waterproofing method is not limited thereto. For example, the method may be a method of immersing a paper board in a solution of water-resisting agent or water-repellant agent such as paraffin wax or phenol resin to coat the surface.

Excellent water-resisting properties against rainfall or moisture from concrete installation are attained by waterproofing the entire surface of a paper board.

In particular, a method of producing a mold by deaerating a bag-like resin film to coat a paper board surface can enhance the strength and rigidity of a paper board because the surface is coated so that a resin film strongly adheres to the mold surface. Furthermore, the mold can be very readily separated from a concrete product after hardening with barely any force.

Bonding

For example, the bonding technique described in Japanese Patent Application No. 2015-43646 (the content thereof is incorporated herein by reference) can be used for bonding the core 4 to the liner paper layers 1 and 2.

As disclosed above, the core 4 is formed by cutting the laminate 40 to the thickness of height H in FIG. 3B. Cutting of the core 4 in a preferred embodiment is explained while also referring to FIGS. 5 to 9. A core constituent member 400 is a single sheet of paper forming wave shapes of the core 4. The core constituent member 400 is cut along the dashed line C with a cutting blade 80, and the liner paper layers 1 and 2 are bonded nearly perpendicularly along the section. The wedge-shaped blade tip of the cutting blade 80 is inserted into the object being cut, the core constituent member 400. As the cutting blade 80 advances, the core constituent member 400 is pushed open to both sides of the blade tip to form a section 410 (see FIGS. 5B and 5C; referred to as the "shoulder portion"). The core constituent member 400 near the section 410 hardly produces paper dust when cut by a cutting blade, remaining with the core constituent member 400 even after cutting. For this reason, the fiber constituting the core constituent member 400 at the section 410 is spread, such that the fiber density decreases while the area increases ("shoulder portion" is formed"). It should be noted that the section 410 does not refer only to the surface created on the core constituent member 400 by cutting, but to a region with an altered fiber density by cutting compared to the density prior to cutting.

In FIG. 5A, the cross-section of the core constituent member 400 when it is assumed that the member has been cleanly cut at the dashed line C (i.e., longitudinal cross section comprising the dashed line C) is the "hypothetical corresponding surface prior to cutting" in the present invention. It is clearly understood that the area of the bonding surface 410 is larger than the hypothetical corresponding surface prior to cutting.

FIG. 6A shows a state where another paper member 420 (specifically, the liner paper layer 1 or 2) is bonded to the section 410 of the core constituent member 400 obtained by cutting with the cutting blade 80 as in FIGS. 5A to 5C. As disclosed above, it is apparent that the section 410 of the core constituent member 400, by cutting with the cutting blade 80, can secure a bonding surface that is broader and larger than the hypothetical corresponding surface prior to cutting. Further, since the fiber density of the section 410 is lower than the fiber density of the core constituent member 400 prior to cutting, an adhesive can readily permeate and adhere. A high bonding strength is materialized thereby, together with the fact that the area of the section 410 of the core constituent member 400 is broader than the hypothetical corresponding surface prior to cutting.

FIG. 6B shows a state where another paper member 420 is bonded to the core constituent member 400 obtained by cutting with a common cutting blade and the section thereof. Compared to FIG. 6A, the bonding surface is smaller at the section of the core constituent member 400 obtained by cutting with a common cutting blade, and the fiber density does not change at the section or the core constituent member 400 in the vicinity thereof. Thus, an adhesive is not readily permeated at the section. Hence, the bonding force to another paper member 420 is weaker compared to the section of the core constituent member 400 that has been cut with a wedge-shaped cutting blade of a preferred embodiment.

FIGS. 7A and 7B show a cutting blade for the aforementioned preferred bonding method. FIGS. 7C and 7D show a cutting blade for a common bonding method. The tip of the cutting blade shown in FIGS. 7A and 7B (clean cut saw) is sharp with a wedge shape. The blade tip is inserted into an object being cut, and as the cutting blade advances, the object being cut is pushed open to both sides of the blade tip. On the other hand, the common cutting blade shown in FIGS. 7C and 7D (chip saw) has a blade tip consisting of tips tilted outward to the left and right and flat tips in an alignment. The object being cut is cut while the object in the amount of the width of the tip is shaved off and changed to paper powder. Thus, cutting with the cutting blade of FIGS. 7A and 7B does not remove the cut portion of the object being cut, but instead breaks down and separates the cut portion to cut without changing paper to paper powder, while cutting with the cutting blade of FIGS. 7C and 7D shaves off and remove the cut portion of the object being cut by changing the portion into paper powder.

FIGS. 8A and 8B show a schematic diagram of a cut formed by a preferred cutting method and a cut formed by a common cutting method. FIG. 8A shows the state of cutting the core constituent member 400 with the cutting blade 80 according to the present invention along C. The wedge-shaped cutting blade 80 cuts the shaded portion of the core constituent member 400 while pushing open the area to the left and right along C. It is understood that the blade tip of the cutting blade 80 is inserted into an object being cut, and as the cutting blade advances, the object being cut is pushed open to both sides of the blade tip. FIG. 8B shows the state of cutting the core constituent member 400 with a common cutting blade 80' along C. It is understood that the cutting blade 80' consists of tips tilted outward to the left and right and flat tips in alignment. The object being cut is cut while the object in the amount of the width of the tip (shaded portion of FIG. 8B) is shaved off and changed to paper powder. It should be noted that the width of cut (shaded portion in each of FIGS. 8A and 8B) in FIG. 8B is greater.

FIG. 9A shows the state of a section of a member that is being cut, formed by the aforementioned preferred cutting method. FIG. 9B shows the state of a section of a member that is being cut, formed by a common cutting method.

The pictures shown in FIGS. 9A and 9B are results of cutting the same member with each of the different cutting blades. As is apparent from comparing FIGS. 9A and 9B, it can be understood that fiber is spread at the section such that the fiber density is smaller and the area is larger by cutting with the cutting blade (clean cut saw) shown in FIGS. 7A and 7B, relative to cutting with the common cutting blade (chip saw) shown in FIGS. 7C and 7D.

Specifically, the fiber density of the section 410 of the core constituent member 400 after cutting by the cutting blade (clean cut saw) shown in FIGS. 7A and 7B is lower than the fiber density of the core constituent member 400 prior to cutting, so that an adhesive can readily permeate the section 410 and adhere to fiber, resulting in the materialization of a high bonding strength. Furthermore, the section 410 of the core constituent member 400 becomes larger than the hypothetical corresponding surface prior to cutting of the core constituent member 400 by cutting. Thus, a broader bonding surface can be secured, resulting in the materialization of a high bonding strength.

Bonding using the preferred wedge-shaped cutting blade can accomplish bonding of the core 4 and the liner layer 1 and/or 2 at a high bonding strength in a vertical direction. For example, when a large load is applied to a board such as a paper pallet, a large load is also applied to the portion connecting a core and a liner paper layer. However, bonding a core and a liner paper layer by a preferred bonding method disclosed above can stabilize a connecting portion, thus achieving a high flexural strength for the entire board (see Example 7).

Pallet Bottom Board

FIG. 10A is a bottom surface side perspective view of the four-way pallet 100 of the invention. FIG. 10B is a bottom view thereof. FIG. 10C is a front view thereof, with the bottom surface side up. FIG. 10D is a side view thereof, with the bottom surface side up. As shown in FIG. 10A, the four-way pallet of the invention, viewed from the bottom surface side, is comprised of a plurality of first bottom boards 200 extending in a first direction (longitudinal direction in FIG. 10A) of the pallet, a plurality of second bottom boards 300 which extend in a second direction (transverse direction in FIG. 10A) orthogonal thereto and are bonded to the first bottom boards 200, legs 400 bonded within a region where the first bottom board 200 and the second bottom board 300 intersect (see the shaded portion in FIG. 10B), and top board 500 bonded to the legs. An aperture 600 for allowing a hand jack wheel to project out is formed between two adjacent first bottom boards 200 and two adjacent second bottom boards 300. The first bottom boards 200 constitute the surface in contact with the ground.

FIGS. 10A and 10C show an embodiment of a pallet in which the first bottom boards 200 are thicker than the second bottom boards 300, but the present invention is not limited thereto. It should be noted that the present invention encompasses an embodiment where the second bottom boards 300 are thicker than the first bottom boards 200 and an embodiment where the first bottom boards 200 have the same thickness as the second bottom boards 300. Further, FIGS. 10A and 10C show an embodiment of a pallet where the second bottom boards 300 extend in the transverse direction, but the present invention is not limited thereto. It should be noted that the present invention encompasses an embodiment where the second bottom boards 300 extend in the longitudinal direction and the first bottom boards 200 extend in the transverse direction.

FIG. 11A is a bottom surface side perspective view of a conventional four-way pallet 100. FIG. 11B is a bottom view thereof. FIG. 11C is a front view thereof, with the bottom surface side up. FIG. 11D is a side view thereof, with the bottom surface side up. As shown in FIG. 11A, the conventional four-way pallet 100 has a bottom board 130 formed by a single sheet of paper and the aperture 600 formed by cutting open the bottom board 130. Legs 140 are bonded to the bottom board 130, and then a top board 150 is bonded thereto.

First Bottom Board and Second Bottom Board

Both the first bottom board 200 and the second bottom board 300 are elongate rectangular paper fragments. The first bottom board 200 and the second bottom board 300 may be formed from the same paper or from different paper.

Examples of the first bottom board 200 that can be used include paper fragments of about 86 mm to 200 mm×about 700 mm to 1400 mm. Typically, paper fragments of about 86 mm×about 1110 mm can be used. The size of the first bottom board 200 can be appropriately determined by those skilled in the art in accordance with the size and strength of the entire pallet, the size of arms of the forklift or hand jack to be used, the size of a hand jack wheel, or the like.

In the present invention, a plurality of first bottom boards 200 are used. The distance between adjacent first bottom boards 200 is about 180 mm to about 400 mm, and typically about 251 mm.

The thickness of the first bottom board 200 is about 1 mm to about 6 mm, preferably about 2 mm to about 4 mm, and more preferably about 4 mm.

Examples of the second bottom board 300 that can be used include paper fragments of about 150 mm to 200 mm×about 700 mm to 1100 mm. Typically, paper fragments of about 170 mm×about 760 mm can be used. The size of the second bottom board 300 can be appropriately determined by those skilled in the art in accordance with the size and strength of the entire pallet, the size of arms of a forklift or hand jack to be used, the size of a hand jack wheel, or the like.

In the present invention, a plurality of second bottom boards 300 are used. The distance between adjacent second boards 300 is about 180 mm to about 400 mm, and typically about 290 mm.

The thickness of the second bottom board 300 is about 1 mm to about 6 mm, preferably about 2 mm to about 4 mm, and more preferably about 2 mm.

The first bottom board 200 and the second bottom board 300 may be formed by pasting together board paper of about 1 mm to about 3 mm which is commonly available.

In the present invention, the thickness of the first bottom board 200 and the thickness of the second bottom board 300 may have any relationship. Specifically, the thickness of the first bottom board 200 may be thicker than the thickness of the second bottom board 300, the thickness of the second bottom board 300 may be thicker than the thickness of the of the first bottom board 200, or the thickness of the first bottom board 200 may be the same as the thickness of the second bottom board 300.

In a preferred embodiment, the first bottom board 200 is thicker than the second bottom board 300. In a representative embodiment, the first bottom board 200 is about 4 mm, and the second bottom board 300 is about 2 mm. In this manner, the first bottom board 200 that is thicker than the second bottom board 300 can secure a height from the surface in contact with the ground of the first bottom board 200 to the second bottom board 300 and avoid absorption of moisture from the ground from the second bottom board 300. In a preferred embodiment, the thickness of the first bottom board 200 is about 1.5 times the thickness of the second bottom board 300 or greater, more preferably about 2.0 times or greater, and more preferably about 2.5 times or greater. The distance between the second bottom board 300 and the surface in contact with the ground can be increased by increasing the thickness of the first bottom board 200. Moisture absorption of the surface in contact with the ground into the second bottom board 300 can be avoided thereby.

The paper weight per area of the first bottom board 200 is about 600 g/m$^2$ to about 3500 g/m$^2$, and preferably about 1400 g/m$^2$ to 3300 g/m$^2$. In general, thickness of 0.25 mm=about 180 g/m$^2$ of paper weight per area.

The paper weight per area of the second bottom board 300 is about 600 g/m$^2$ to about 3500 g/m$^2$, and preferably about 1400 g/m$^2$ to about 3300 g/m2.

In the present invention, the paper weight per area of the first bottom board 200 and the paper weight per area of the second bottom board 300 may have any relationship. Specifically, the paper weight per area of the first bottom board 200 may be greater than the paper weight per area of the second bottom board 300, the paper weight per area of the second bottom board 300 may be greater than the paper weight per area of the first bottom board 200, or the paper weight per area of the first bottom board 200 may be the same as the paper weight per area of the second bottom board 300.

When the first bottom board 200 and the second bottom board 300 are formed from different paper, the first bottom board 200 preferably has a higher paper weight per area than the second bottom board 300. In a representative embodiment, the paper weight per area of the first bottom board 200 is about 2400 g/m$^2$ to about 3000 g/m$^2$, and the paper weight per area of the second bottom board 300 is about 1200 g/m$^2$ to about 1600 g/m$^2$. In a preferred embodiment, the paper weight per area of the first bottom board 200 is about 1.5 times the paper weight per area of the second bottom board 300 or greater, more preferably about 2.0 times or greater, and more preferably about 2.5 times or greater.

In an especially preferred embodiment of the present invention, both the thickness and the paper weight per area of the first bottom board 200 are greater than the thickness and paper weight per area of the second bottom board 300, respectively.

In one embodiment of the present invention, as shown in FIGS. 10A to 10D, the strength of the entire pallet can be efficiently enhanced by increasing the thickness and/or paper weight per area of the first bottom board 200 along the longitudinal direction. Specifically, as shown in the following Examples, the force applied to the longitudinal direction side is greater than the force applied to the transverse direction side when a forklift or hand jack arm is inserted into a rectangular four-way pallet. In other words, a strength on the longitudinal direction side is required more than the strength on the transverse direction side. This is because the dimension outside the forklift or hand jack claws (dimension of the portion outside of two claws of a forklift or hand jack when inserted into a pallet) is greater in the longitudinal direction. In this regard, it was necessary to increase the thickness and/or paper weight per area of the entire bottom board to match the strength required by the longitudinal direction side when the bottom board of a pallet is made of a single sheet of paper as in conventional techniques. However, in a preferred embodiment of the present invention, the first bottom board 200 extending in the longitudinal direction and the second bottom board 300 extending in the transverse direction can be combined to decrease the paper weight per area of the second bottom board 300 that does not required strength and increase the paper weight per area of the first bottom board 200 that requires more strength to form a conventional bottom board.

It was not easy to cut out an aperture in the manufacture of conventional four-way pallets with a bottom board formed from a single sheet of paper when the thickness or paper weight per area of the bottom board is high. This is because an aperture cannot be cut out with a common apparatus (e.g., rotary die cutters that are commercially available from various sources) for paper with significant thickness or paper weight per area. For example, board paper with thickness of about 2 mm cannot be cut out with a common rotary die cutter, so it is necessary to use a flatbed die cutter (platen die cutter) for board paper that is thicker (e.g., about 3 mm or about 4 mm which is commonly available). Furthermore, both types of die cutters have a problem in that the cutting blade is readily damaged. However, the bottom board of the invention can be manufactured by simply cutting a large sheet of paper in a straight line because first and second bottom boards have an elongate and rectangular shape. Thus, complex processing, such as cutting out an aperture, is not necessary. For this reason, paper with significant thickness or paper weight per area can be used for bottom boards.

Manufacturing Method

FIGS. 12A to 12C show a representative manufacturing method of the four-way pallet of the invention. As shown in FIG. 12A, the legs 400 are first bonded to the top board 500. In a preferred embodiment, the top board 500 is the paper board structure 10 shown in FIG. 1A and the like. The number of legs can be appropriately determined by those skilled in the art in accordance with the size of the pallet, application, and the type of forklift or hand jack to be used.

As shown in FIG. 12B, the second bottom boards 300 are bonded, along the transverse direction, to the legs 400 bonded to the top board 500 in FIG. 12A. The second bottom boards 300 can be readily manufactured by cutting board paper.

As shown in FIG. 12C, the first bottom boards 200 are further bonded, along the legs 400, to the pallet in which the second bottom boards 300 are bonded to the legs 400 in FIG. 12B. The choice of thickness and paper weight per area of the first bottom boards 200 is important in the present invention. First of all, the second bottom boards 300, legs 400, and the top board 500 are separated from the surface in contact with the ground by the thickness of the first bottom boards 200. This suppresses absorption of moisture on the surface in contact with the ground into the second bottom boards 300, the legs 400, and the top board 500.

As disclosed above, the force applied to the longitudinal direction side is greater than the force applied to the transverse direction side when a forklift or hand jack arm is inserted into a rectangular four-way pallet. Thus, it is necessary to appropriately adjust the thickness and/or paper weight per area of the first bottom board 200 in accordance with the size of the pallet, application, and forklift or hand jack to be used.

Those skilled in the art can appropriately determine the thickness and/or paper weight per area of paper used as the first bottom boards 20 and the second bottom boards 300.

The first bottom board 200 and the second bottom board 300 can be prepared by cutting board paper into an elongate rectangular strip. Examples of sizes of board paper that are generally commercially available include, but are not limited to, 1100 mm×1350 mm and 1150 mm×1450 mm.

In FIGS. 12A to 12C, the legs 400 are bonded to the top board 500, the second bottom boards 300 are bonded to the legs 400, and the first bottom boards 200 are bonded to the second bottom boards 300, but any bonding order may be used.

For example, the second bottom boards 300 may be bonded to the first bottom boards 200, the legs 400 bonded to the second bottom boards 300, and the top board 500 bonded to the legs 400. Alternatively, the legs 400 may be bonded to the top board 500, and separately the second bottom boards 300 bonded to the first bottom boards 200, and lastly the legs 400 bonded to the second bottom boards 300. The legs 400 may be bonded to the second bottom boards 300 or the top board 500 by any known method, but it is especially preferable to use the method explained in the aforementioned "Bonding" section while referring to FIGS. 5A to 9B.

Top Board

A top board of the pallet of the invention may be any top pallet, as long as it is made of paper. Of course a top board needs to impart to a pallet a flexural strength that can withstand lifting by a forklift or a hand jack while a load is loaded.

A structure produced by sandwiching a reinforcement core structure with paper layers from the top and bottom (e.g., paper board structure 10 shown in FIG. 1A and the like) may be used as a top board of a paper pallet.

When the paper board structure 10 shown in FIG. 1A is used as a top board, subject being transported may be supported on the paper layer 2 side or on the paper layer 3 side. Although not intended to limit the present invention, when a subject that would load a concentrated weight to one portion of a top board is transported, it is preferable to support the subject with the paper layer 3 side on top. When a subject that would load the weight evenly on almost the entire surface of a top board, it is preferable to support the subject with the paper layer 2 with the paper layer 3 side on the bottom because a flexural load thereof applies a compression force on the bottom side.

In general, a large flexural strength is required on the bottom side of a top board of a pallet (side held by a forklift or hand jack arm) for transportation pallets. Thus, when the paper board structure 10 shown in FIG. 1A is used as a transportation pallet, the paper layer 3 can be placed on the bottom side (side held by a forklift or hand jack arm) to efficiently use the structure as a transportation pallet with a desired flexural strength.

Legs

The legs 400 of the invention may have any shape or structure as long as they are made of paper. The legs 400 may be, for example, a cuboid, a cube, or a cylinder. The legs 400 may have a similar structure to the core 4 of the paper board structure 10. Specifically, the core 4 in FIGS. 2A and 2B can be processed into a suitable shape as the legs 400.

Waterproofing

Paper members used in the pallet of the invention may be waterproofed. In a preferred embodiment, at least the first bottom boards 200 of the paper pallet of the invention are waterproofed. Waterproofed first bottom boards 200 can be obtained by cutting a waterproofed sheet of paper as the first bottom board 200, or by cutting a sheet of paper as the first bottom board 200 and waterproofing the paper thereafter.

Typically, waterproofing can be performed by applying a water-resisting agent or water-repellant agent on the surface of paper, but the method is not limited thereto. A known water-resisting agent or water-repellant agent for paper can be used as the water-resisting agent or water-repellant agent, and preferably a known water-resisting agent or water-repellant agent for cardboard can be used.

In a preferred embodiment, waterproofed first bottom boards 200 can be manufactured by applying a water-resisting agent or water-repellant agent to a sheet of paper and then cutting the paper into a desirable size. In a preferred embodiment, a roller can be used to apply a water-resisting agent or water-repellant agent to a sheet of paper. In a preferred embodiment, paper subjected to application of waterproofing can be limited to only bottom boards extending in the longitudinal direction and bottom boards extending in the transverse direction that are in contact with the ground. A pallet can be manufactured thereby at a low cost. In a particularly preferred embodiment, only bottom boards that are in contact with the ground are waterproofed, while other portions such as a top board, which is the freight loading surface, are not in the pallet of the invention. The amount of paper requiring waterproofing can be reduced thereby, resulting in reduced cost associated with pallet manufacturing. Furthermore, waterproofing can be kept to a minimum by using a shorter bottom board, among the bottom boards extending in the longitudinal direction and bottom boards extending in the transverse direction, for the surface in contact with the ground, and waterproofing only such short bottom boards.

OTHER EMBODIMENTS

As described above, the present invention has been described while showing preferred embodiments to facilitate understanding. The present invention is described hereinafter based on the Examples. The aforementioned description and the following Examples are not provided to limit the present invention, but for the sole purpose of exemplification. Thus, the scope of the present invention is not limited to the embodiments and Examples specifically described herein and is only limited by the scope of the claims.

EXAMPLES

Example 1

As the paper board of the invention, three boards with the paperboard layer 3 having a thickness (paper weight per area) of 1 mm (about 700 g/m$^2$) (Example 1-1), 2 mm (about 1400 g/m$^2$) (Example 1-2), and 4 mm (about 2800 g/m$^2$) (Example 1-3) were manufactured, with the paper weight per area of liner paper layer 1 of 210 g/m$^2$ (thickness of about 0.3 mm), paper weight per area of the liner paper layer 2 of 700 g/m$^2$ (thickness of about 1.0 mm), paper weight per area of paper used for the core 4 of 220 g/m$^2$, and the thickness of 30 mm for the board-like structure (core 4 and liner paper layers 1 and 2), in accordance with the manufacturing method shown in FIGS. 3A to 3D. Specifically, an adhesive with the primary ingredient of starch was applied to the bonding surface of the liner paper layer 1 and the liner paper layer 2 of the core 4 that were unwound from a roll, then the liner paper layer 1 and the liner paper layer 2 were overlaid on the bonding surface in a sandwich-like manner and pressured to bond both paper layers to the core. A water-soluble vinyl acetate-based resin (e.g., CN-135, Konishi Co., Ltd, Osaka, Japan) adhesive was used thereafter on the liner paper layer 1 to bond the paperboard layer 3. A board without a paperboard layer 3 was also manufactured as a reference (Reference Example 1).

Example 2

As in Example 1, three boards with the paperboard layer 3 having a thickness (paper weight per area) of 1 mm (about 700 g/m$^2$) (Example 2-1), 2 mm (about 1400 g/m$^2$) (Example 2-2), and 4 mm (about 2800 g/m$^2$) (Example 2-3) were manufactured as Example 2, with the paper weight per area of the liner paper layer 1 of 700 g/m$^2$ (thickness of about 1.0 mm), paper weight per area of the liner paper layer 2 of 700 g/m$^2$ (thickness of about 1.0 mm), paper weight per area of paper used for the core 4 of 280 g/m$^2$, and the thickness of 30 mm for the board-like structure. A board without a paperboard layer 3 was also manufactured as a reference (Reference Example 2).

Example 3

As in Examples 1 and 2, three boards with the paperboard layer 3 having a thickness (paper weight per area) of 1 mm (about 700 g/m$^2$) (Example 3-1), 2 mm (about 1400 g/m$^2$) (Example 3-2), and 4 mm (about 2800 g/m$^2$) (Example 3-3) were manufactured as Example 3, with the paper weight per area of the liner paper layer 1 of 700 g/m$^2$ (thickness of about 1.0 mm), paper weight per area of the liner paper layer 2 of 700 g/m$^2$ (thickness of about 1.0 mm), paper weight per area of paper used for the core 4 of 280 g/m$^2$, and the thickness of 40 mm for the board-like structure. A board without a paperboard layer 3 was also manufactured as a reference (Reference Example 3).

Example 4

Three boards with the paperboard layer 3 having a thickness (paper weight per area) of 1 mm (about 700 g/m$^2$) (Example 4-1), 2 mm (about 1400 g/m$^2$) (Example 4-2), and 4 mm (about 2800 g/m$^2$) (Example 4-3) were manufactured as Example 4, with the paper weight per area of the liner paper layer 1 of 700 g/m$^2$ (thickness of about 1.0 mm), paper weight per area of the liner paper layer 2 of 700 g/m$^2$ (thickness of about 1.0 mm), paper weight per area of paper used for the core 4 of 280 g/m$^2$, and the thickness of mm for the board-like structure. A board without a paperboard layer 3 was also manufactured as a reference (Reference Example 4).

The size of each of the above-described boards was horizontal side 500 mm×longitudinal side 333 mm. Rollable paper was used as the liner paper layer 1 and the liner paper layer 2, and planographic paper was used as the paperboard layer 3.

The conditions for each board in Examples 1 to 4 are summarized in the following table.

TABLE 1

|  | Liner paper layer 1 (g/m$^2$) | Liner paper layer 2 (g/m$^2$) | Paperboard layer (g/m$^2$) | Core (g/m$^2$) | Board-like structure (mm) |
| --- | --- | --- | --- | --- | --- |
| Reference Example | 210 | 700 | — | 220 | 30 |
| Example 1-1 | 210 | 700 | 700 | 220 | 30 |
| Example 1-2 | 210 | 700 | 1400 | 220 | 30 |
| Example 1-3 | 210 | 700 | 2800 | 220 | 30 |

TABLE 1-continued

|  | Liner paper layer 1 (g/m$^2$) | Liner paper layer 2 (g/m$^2$) | Paperboard layer (g/m$^2$) | Core (g/m$^2$) | Board-like structure (mm) |
| --- | --- | --- | --- | --- | --- |
| Reference Example 2 | 700 | 700 | — | 280 | 30 |
| Example 2-1 | 700 | 700 | 700 | 280 | 30 |
| Example 2-2 | 700 | 700 | 1400 | 280 | 30 |
| Example 2-3 | 700 | 700 | 2800 | 280 | 30 |
| Reference Example 3 | 700 | 700 | — | 280 | 40 |
| Example 3-1 | 700 | 700 | 700 | 280 | 40 |
| Example 3-2 | 700 | 700 | 1400 | 280 | 40 |
| Example 3-3 | 700 | 700 | 2800 | 280 | 40 |
| Reference Example 4 | 700 | 700 | — | 280 | 50 |
| Example 4-1 | 700 | 700 | 700 | 280 | 50 |
| Example 4-2 | 700 | 700 | 1400 | 280 | 50 |
| Example 4-3 | 700 | 700 | 2800 | 280 | 50 |

Flexural Strength Test

The flexural strength of each structure in Table 1, with respect to a single point concentrated load, was tested at the Industrial Technology Center of Okayama Prefecture. Prior to testing, each board was left standing for 24 hours under conditions of 23° C. and a humidity of 50%. On Dec. 3, 2014, flexural strength (kg) of each structure in a span of 400 mm was measured with single point concentrated load (load at location of effort 30 in FIG. 4) at a rate of 10 mm/minute. The temperature at the start of testing (10:05 AM) was 12° C. and the humidity was 38%, and the temperature at the end of testing (11:45 AM) was 17° C. and the humidity was 33%. The distance between fulcrum 31 and fulcrum 32 in FIG. 4 was 400 mm.

The actual measurement value (kg) of flexural strength of each board is summarized in the following Table.

TABLE 2

| Reference Example 1 | First | 58.2 |
| --- | --- | --- |
|  | Second | — |
|  | Mean | 58.2 |
| Example 1-1 | First | 152.0 |
|  | Second | 156.1 |
|  | Third | 158.2 |
|  | Mean | 155.4 |
|  | Factor | 2.7 |
| Example 1-2 | First | 225.5 |
|  | Second | 232.7 |
|  | Third | 236.7 |
|  | Mean | 231.6 |
|  | Factor | 4.0 |
| Example 1-3 | First | 334.7 |
|  | Second | 333.7 |
|  | Third | 322.4 |
|  | Mean | 330.3 |
|  | Factor | 5.7 |
| Reference Example 2 | First | 122.4 |
|  | Second | 118.4 |
|  | Mean | 120.4 |
| Example 2-1 | First | 193.9 |
|  | Second | 207.1 |
|  | Third | 189.8 |
|  | Mean | 196.9 |
|  | Factor | 1.6 |
| Example 2-2 | First | 246.9 |
|  | Second | 248.0 |
|  | Third | 255.1 |
|  | Mean | 250.0 |
|  | Factor | 2.1 |

TABLE 2-continued

| Example | | |
|---|---|---|
| Example 2-3 | First | 333.7 |
| | Second | 334.7 |
| | Third | 321.4 |
| | Mean | 329.9 |
| | Factor | 2.7 |
| Reference Example 3 | First | 166.3 |
| | Second | 167.3 |
| | Mean | 166.8 |
| Example 3-1 | First | 251.0 |
| | Second | 246.9 |
| | Third | 253.1 |
| | Mean | 250.3 |
| | Factor | 1.5 |
| Example 3-2 | First | 312.2 |
| | Second | 340.8 |
| | Third | 345.9 |
| | Mean | 333.0 |
| | Factor | 2.0 |
| Example 3-3 | First | 483.7 |
| | Second | 485.7 |
| | Third | 492.9 |
| | Mean | 487.4 |
| | Factor | 2.9 |
| Reference Example 4 | First | 194.9 |
| | Second | 215.3 |
| | Mean | 205.1 |
| Example 4-1 | First | 324.5 |
| | Second | 344.9 |
| | Third | 320.4 |
| | Mean | 329.9 |
| | Factor | 1.6 |
| Example 4-2 | First | 419.4 |
| | Second | 390.8 |
| | Third | 367.3 |
| | Mean | 392.5 |
| | Factor | 1.9 |
| Example 4-3 | First | 572.4 |
| | Second | 568.4 |
| | Third | 577.6 |
| | Mean | 572.8 |
| | Factor | 2.8 |

The "Factor" in Table 2 indicates the factor of change from the actual measurement value of flexural strength of the corresponding Reference Example. The factor in Examples 1-1 to 1-3 is a factor of change in the actual measurement value of flexural strength from Reference Example 1, the factor in Examples 2-1 to 2-3 is a factor of change in the actual measurement value of flexural strength from Reference Example 2, the factor in Examples 3-1 to 3-3 is a factor of change in the actual measurement value of flexural strength from Reference Example 3, and the factor in Examples 4-1 to 4-3 is a factor of change in the actual measurement value of flexural strength from Reference Example 4.

As can be seen from Table 2, the actual measurement values of the paper board 10 were significantly enhanced by bonding the paperboard layer 3 to the liner paper layer 1 in all Examples. In particular, it was discovered, in view of the above results, that an increase in flexural strength that is comparable to, or exceeds, an increase of 10 mm in the thickness of a board-like structure is achieved by simply providing an additional paperboard layer 3 of about 1 mm (for specific values, compare the flexural strength in Example 2-1 to that of Reference Example 3, and the flexural strength in Example 3-1 to that of Reference Example 4). In view of the above, the inventor has discovered that the flexural strength of a board can be enhanced efficiently without significantly increasing the thickness of a board by pasting an additional paperboard layer 3.

Furthermore, the factor of increase in the actual measurement values of flexural strength of a board in Examples 1-1 to 1-3 with respect to Reference Example 1 when paper weight per area of the paperboard layer 3 was enhanced was significantly higher compared to the factor of increase in Examples 2-1 to 2-3 with respect to Reference Example 2, the factor of increase in Examples 3-1 to 3-3 with respect to Reference Example 3, and the factor of increase in Examples 4-1 to 4-3 with respect to Reference Example 4. This demonstrates that the effect of reinforcement with the paperboard layer 3, by providing the liner paper layer 1 with smaller paper weight per area than that of the liner paper layer 2, very efficiently strengthens the flexural strength of the entire board.

If Example 1-3 and Example 2-3 are compared in particular, it should be noted that the actual measurement value of flexural strength of the entire board is better in Example 1-3, despite the paper weight per area of the liner paper layer 1 in Example 2-3 increasing from 210 $g/m^2$ to 700 $g/m^2$ and the paper weight per area of the paper of the core increasing from 220 $g/m^2$ to 280 $g/m^2$ (under the condition that the liner paper layer 2, the paperboard layer 3, and the core height are identical). In Example 1-3, the entire board had a high flexural strength, despite using the paper layer 1 and core with paper weight per area that is less than that in Example 2-3 to dramatically reduce cost more than Example 2-3. This is a result demonstrating the significant and excellent effect of the present invention.

Further, Examples 1-3 and Example 4-1 are compared. In Example 1-3, planographic paper with a paper weight per area of 2800 $g/m^2$ was used as the paperboard layer 3, while in Example 4-1 the paperboard layer 3 was not provided, but instead the paper weight per area of paper of the core was increased from 220 $g/m^2$ to 280 $g/m^2$ and the thickness of the board was increased from 30 mm to 50 mm. It should be noted that the increase in cost involving the change in conditions of the core far exceeds the increase in cost due to the use of planographic paper with paper weight per area of 2800 $g/m^2$ as the paperboard layer 3. This is because a variety of low cost paper such as used waste paper can be used as the planographic paper of the paperboard layer 3. When Example 1-3 is compared to Example 4-1 in this manner, Example 1-3 had a higher flexural strength despite Example 1-3 being cheaper. This is also a result demonstrating a significant excellent effect of the present invention.

The flexural strength (kg/m) of the board used in each Example is shown below. The weight of each board is a value assuming a 1 m length. Thus, the actual measurement value of flexural strength is also correspondingly converted to a m length. Specifically, the size of each board was horizontal side 500 mm×longitudinal side 333 mm, so that the actual measurement value of flexural strength of each board was multiplied by 3 to calculate a flexural strength thereof for 1 m length. Furthermore, the value measured with respect to single point concentrated load was doubled to convert the value into a value for uniformly distributed load.

| | Flexural strength | Board weight (kg) | Flexural strength (/kg) |
|---|---|---|---|
| Reference Example 1 | 349.2 | 2.753 | 126.8 |
| Example 1-1 | 932.7 | 3.453 | 270.1 |
| Example 1-2 | 1389.8 | 4.153 | 334.6 |
| Example 1-3 | 1981.6 | 5.553 | 356.9 |
| Reference Example 2 | 722.4 | 3.745 | 192.9 |

-continued

|  | Flexural strength | Board weight (kg) | Flexural strength (/kg) |
|---|---|---|---|
| Example 2-1 | 1181.6 | 4.445 | 265.8 |
| Example 2-2 | 1500.0 | 5.145 | 291.5 |
| Example 2-3 | 1979.6 | 6.545 | 302.5 |
| Reference Example 3 | 1001.0 | 4.456 | 224.6 |
| Example 3-1 | 1502.0 | 5.156 | 291.3 |
| Example 3-2 | 1998.0 | 5.856 | 341.2 |
| Example 3-3 | 2924.5 | 7.256 | 403.0 |
| Reference Example 4 | 1230.6 | 5.167 | 238.2 |
| Example 4-1 | 1979.6 | 5.867 | 337.4 |
| Example 4-2 | 2355.1 | 6.567 | 358.6 |
| Example 4-3 | 3436.7 | 7.967 | 431.4 |

As disclosed above, each Example has a significantly greater flexural strength per board weight with respect to the Reference Example. This demonstrates a significant effect of the present invention, which allows efficient increase in the strength of paper board structures.

A test similar to the aforementioned Examples was conducted on an exemplary wood board, resulting in a flexural strength of 811.0 kg. Comparison of this value to the flexural strength of 932.7 kg in Example 1-1 revealed that the strength of the paper board structure of the invention is comparable or even better than that of a wood board.

Example 5

The inventor has found the possibility of enhancing a flexural strength of a board efficiently without significantly increasing the thickness of the board by pasting an additional paperboard layer 3, in view of the results in Example 4. Thus, the possibility was further examined in detail in this Example.

The following shows the thickness and flexural strength of a board-like structure when using 500 g/m$^2$ (thickness of about 0.7 mm) rollable paper as the liner paper layers 1 and 2 and using the following 1 mm to 4 mm paperboards. Each board was left standing for 24 hours under conditions of 23° C. and humidity of 50%. The flexural strength (kg/m) of each structure was then measured by converting the measurement value from single point concentrated load (load at location of effort 30 in FIG. 4) at a rate of 10 mm/minute.

TABLE 4

| | Flexural strength (kg/m: uniformly distributed load with 400 mm span) | | | | |
|---|---|---|---|---|---|
| Thickness of board-likes structure (mm) | Only board-like structure (no paperboard) | Paperboard (1 mm) | Paperboard (2 mm) | Paperboard (3 mm) | Paperboard (4 mm) |
| 15 | 280 | 512 | 694 | 735 | |
| 20 | 384 | 735 | 963 | 1016 | |
| 30 | 655 | 1298 | 1669 | 1794 | 1918 |
| 40 | 804 | | | | |
| 50 | 953 | | | | |
| 60 | 1144 | | | | |

As can be seen from the results in Table 4, the flexural strength increased significantly more by pasting a 1 mm to 4 mm paperboard than by increasing the thickness of the board-like structure (and consequently the thickness of the entire board). In view of the above, the inventor has discovered that a high flexural strength in a board can be materialized while minimizing the increase in the thickness of a board-like structure by combining a 1 mm to 4 mm paperboard with the board-like structure. The results in Table 4 demonstrate that a significant increase in flexural strength is achieved by bonding a 1 mm to 4 mm paperboard on one side of a 15 mm to 40 mm board-like structure. For example, a flexural strength exceeding that of a board-like structure with a thickness of 60 mm can be achieved by bonding, to a board-like structure with a thickness of 30 mm, a 1 mm paperboard, which is about 3% of the thickness thereof.

Example 6: Comparison of Paperboard and Cardboard

Not only paperboard, but also cardboard is considered an option as industrial paper. Thus, the final flexural strengths of boards were compared between use of a paperboard and a cardboard as a paper layer added to a board-like structure.

In the board-like structure of the present Example, 700 g/m$^2$ (thickness of about 1 mm) rollable paper was used as the liner paper layers 1 and 2. The thickness of the board-like structure was 30 mm. Each board was left standing for 24 hours under conditions of 23° C. a humidity of 50%. The flexural strength (kg/m) of each structure was then measured by converting the measurement value from single point concentrated load (load at location of effort 30 in FIG. 4) at a rate of 10 mm/minute.

TABLE 5

| No bonding | | 1 | 808.2 |
|---|---|---|---|
| | | 2 | 802.0 |
| | | 3 | 808.2 |
| | | Mean | 806.1 |
| | | Paper weight per area (kg/m$^2$) | 3.58 |
| | | Flexural strength/ paper weight per area | 225.2 |
| Reinforcing bond | | | |
| Paperboard | Thickness of 1 mm (0.70 kg/m$^2$) | 1 | 1346.9 |
| | | 2 | 1328.6 |
| | | 3 | 1346.9 |
| | | Mean | 1340.8 |
| | | Overall paper weight per area (kg/m$^2$) | 4.28 |
| | | Flexural strength/paper weight per area | 313.3 |
| | | Increase in flexural strength | 534.7 |
| | | Increased strength/(reinforcement material paper weight per area) | 763.8 |
| | Thickness of 2 mm (1.40 kg/m$^2$) | 1 | 1744.9 |
| | | 2 | 1695.9 |
| | | 3 | 1689.8 |
| | | Mean | 1710.2 |
| | | Overall paper weight per area (kg/m$^2$) | 4.98 |
| | | Flexural strength/ paper weight per area | 343.4 |
| | | Increase in flexural strength | 904.1 |
| | | Increased strength/ (reinforcement material paper weight per area) | 645.8 |

TABLE 6

| Reinforcing bond | | | |
|---|---|---|---|
| Cardboard | Thickness of 5 mm (short grain) (0.626 kg/m²) | 1 | 1053.1 |
| | | 2 | 1089.8 |
| | | 3 | 1120.4 |
| | | Mean | 1087.8 |
| | | Overall paper weight per area (kg/m²) | 4.21 |
| | | Flexural strength/paper weight per area | 258.6 |
| | | Increase in flexural strength | 281.6 |
| | | Increased strength (reinforcement material paper weight per area) | 449.9 |
| | Thickness of 5 mm (long grain) (0.626 kg/m²) | 1 | 893.9 |
| | | 2 | 930.6 |
| | | 3 | 875.5 |
| | | Mean | 900.0 |
| | | Overall paper weight per area (kg/m²) | 4.21 |
| | | Flexural strength/paper weight per area | 214.0 |
| | | Increase in flexural strength | 93.9 |
| | | Increased strength (reinforcement material paper weight per area) | 150.0 |
| | Thickness of 8 mm (short grain) (1.034 kg/m²) | 1 | 1273.5 |
| | | 2 | 1322.4 |
| | | 3 | 1291.8 |
| | | Mean | 1295.9 |
| | | Overall paper weight per area (kg/m²) | 4.61 |
| | | Flexural strength/paper weight per area | 280.9 |
| | | Increase in flexural strength | 489.8 |
| | | Increased strength (reinforcement material paper weight per area) | 473.7 |
| | Thickness of 8 mm (long grain) (1.034 kg/m²) | 1 | 942.9 |
| | | 2 | 1071.4 |
| | | 3 | 991.8 |
| | | Mean | 1002.0 |
| | | Overall paper weight per area (kg/m²) | 4.61 |
| | | Flexural strength/paper weight per area | 217.2 |
| | | Increase in flexural strength | 195.9 |
| | | Increased strength (reinforcement material paper weight per area) | 189.5 |

As is apparent by comparing Table 5 with Table 6, the flexural strength of 1340.8 kg/m attained by bonding a 1 mm (paper weight per area of 0.7 kg/m²) paperboard significantly exceeded the flexural strength of 1087.8 kg/m of short gain and the flexural strength of 900.0 kg/m of long grain when a 5 mm (paper weight per area of 0.626 kg/m²) cardboard was bonded. Surprisingly, it exceeded even the flexural strength in cases where a cardboard with a thickness of 8 mm (paper weight per area of 1.034 kg/m) was bonded. When a paperboard was used, the flexural strength can be increased without increasing the thickness compared to cases using a cardboard, such that the flexural strength per thickness and the flexural strength per paper weight per area are significantly greater.

It should be noted that there is a significant difference in the flexural strength between long grain and short grain when cardboard is used as an additional paper layer. Such a difference in flexural strength can be crucial when a board is used as the top board of a pallet. This is because the flexural strength of long grain with weaker strength must be the baseline for pallets called "four-way", which is a type of pallet into which lift claws are inserted from both the X and Y directions. To compensate for the difference, there are boards produced by pasting two sheets of cardboard in a crisscross manner, but further increase in thickness cannot be avoided. In this regard, a board with a paperboard bonded thereto is advantageous in having no difference in strength depending on the direction.

Furthermore, the effect due to humidity was tested. The boards of "23° C.·50%" were left standing for 24 hours under the conditions of 23° C. temperature and 50% humidity, and the boards of "40° C.·90%" were left standing under the conditions of 40° C. temperature and 90% humidity. The flexural strength (kg/m) of each structure was then measured by converting the measurement value from single point concentrated load (load at location of effort 30 in FIG. 4) at a rate of 10 mm/minute.

TABLE 7

| | | 23° C. · 50% | 23° C. · 50% | 40° C. · 90% |
|---|---|---|---|---|
| | Board-like structure thickness (mm) | 30 | 30 | 30 |
| | Top liner | 1 mm (700 g/m²) | 0.7 mm (500 g/m²) | 0.7 mm (500 g/m²) |
| | Core (g/m²) | 200 g | 200 g | 200 g |
| | Lower liner | 1 mm (700 g/m²) | 0.7 mm (500 g/m²) | 0.7 mm (500 g/m²) |
| Board-like structure only | 1 | 808.2 | 655.1 | 428.6 |
| | 2 | 802.0 | 636.7 | 465.3 |
| | 3 | 808.2 | 673.5 | 428.6 |
| | Mean | 806.1 | 655.1 | 440.8 |
| | Paper weight per area (kg/m²) | 3.58 | 3.18 | 3.18 |
| | Flexural strength/paper weight per area | 225.2 | 206.0 | 138.6 |

TABLE 7-continued

|  |  |  | 23° C. · 50% | 23° C. · 50% | 40° C. · 90% |
|---|---|---|---|---|---|
| Reinforcing bond | | | | | |
| Paperboard | Thickness of 1 mm (0.70 kg/m²) | 1 | 1346.9 | 1249.0 | 893.9 |
| | | 2 | 1328.6 | 1316.3 | 838.8 |
| | | 3 | 1346.9 | 1328.6 | 881.6 |
| | | Mean | 1340.8 | 1298.0 | 871.4 |
| | | Overall paper weight per area (kg/m²) | 4.28 | 3.88 | 3.88 |
| | | Flexural strength/paper weight per area | 313.3 | 334.5 | 224.6 |
| | | Increase in flexural strength | 534.7 | 642.9 | 430.6 |
| | | Increased strength/(reinforcement material paper weight per area) | 763.8 | 918.4 | 615.2 |
| | Thickness of 2 mm (1.40 kg/m²) | 1 | 1744.9 | 1653.1 | 1279.6 |
| | | 2 | 1695.9 | 1738.8 | 1224.5 |
| | | 3 | 1689.8 | 1616.3 | 1273.5 |
| | | Mean | 1710.2 | 1669.4 | 1259.2 |
| | | Overall paper weight per area (kg/m²) | 4.98 | 4.58 | 4.58 |
| | | Flexural strength/paper weight per area | 343.4 | 364.5 | 274.9 |
| | | Increase in flexural strength | 904.1 | 1014.3 | 818.4 |
| | | Increased strength/(reinforcement material paper weight per area) | 645.8 | 724.5 | 584.5 |
| | Thickness of 3 mm (2.10 kg/m²) | 1 | 1995.9 | 1781.6 | 1500.0 |
| | | 2 | 1946.9 | 1818.4 | 1383.7 |
| | | 3 | 1995.9 | 1781.6 | 1371.4 |
| | | Mean | 1979.6 | 1793.9 | 1418.4 |
| | | Overall paper weight per area (kg/m²) | 5.68 | 5.28 | 5.28 |
| | | Flexural strength/paper weight per area | 348.5 | 339.7 | 268.6 |
| | | Increase in flexural strength | 1173.5 | 1138.8 | 977.6 |
| | | Increased strength/(reinforcement material paper weight per area) | 558.8 | 542.3 | 465.5 |

TABLE 8

|  |  |  | 23° C. · 50% | 23° C. · 50% | 40° C. · 90% |
|---|---|---|---|---|---|
| Reinforcing bond | | | | | |
| Cardboard | Thickness of 5 mm (short grain) (0.626 kg/m²) | 1 | 1053.1 | 1004.1 | 606.1 |
| | | 2 | 1089.8 | 961.2 | 575.5 |
| | | 3 | 1120.4 | 998.0 | 593.9 |
| | | Mean | 1087.8 | 987.8 | 591.8 |
| | | Overall paper weight pera rea (kg/m²) | 4.21 | 3.81 | 3.81 |
| | | Flexural strength/paper weight per area | 258.6 | 259.5 | 155.5 |
| | | Increase in flexural strength | 281.6 | 332.7 | 151.0 |
| | | Increased strength/ (reinforcement material paper weight per area) | 449.9 | 531.4 | 241.2 |
| | Thickness of 5 mm (long grain) (0.626 kg/m²) | 1 | 893.9 | 912.2 | 483.7 |
| | | 2 | 930.6 | 887.8 | 514.3 |
| | | 3 | 875.5 | 808.2 | 514.3 |
| | | Mean | 900.0 | 869.4 | 504.1 |
| | | Overall paper weight per area (kg/m²) | 4.21 | 3.81 | 3.81 |
| | | Flexural strength/paper weigh per area | 214.0 | 228.4 | 132.4 |
| | | Increase in flexural strength | 93.9 | 214.3 | 63.3 |

TABLE 8-continued

| | | 23° C. · 50% | 23° C. · 50% | 40° C. · 90% |
|---|---|---|---|---|
| | Increased strength/(reinforcement material paper weight per area) | 150.0 | 342.3 | 101.1 |
| Thickness of 8 mm (short grain) (1.034 kg/m²) | 1 | 1273.5 | 1359.2 | 802.0 |
| | 2 | 1322.4 | 1310.2 | 832.7 |
| | 3 | 1291.8 | 1279.6 | 875.5 |
| | Mean | 1295.9 | 1316.3 | 836.7 |
| | Overall paper weight per area (kg/m²) | 4.61 | 4.21 | 4.21 |
| | Flexural strength/paper weight per area | 280.9 | 312.4 | 198.6 |
| | Increase in flexural strength | 489.8 | 661.2 | 395.9 |
| | Increased strength/(reinforcement material paper weight per area) | 473.7 | 639.5 | 382.9 |
| Thickness of 8 mm (long grain) (1.034 kg/m²) | 1 | 942.9 | 1040.8 | 612.2 |
| | 2 | 1071.4 | 1034.7 | 612.2 |
| | 3 | 991.8 | 1028.6 | 593.9 |
| | Mean | 1002.0 | 1034.7 | 606.1 |
| | Overall paper weight per area (kg/m²) | 4.61 | 4.21 | 4.21 |
| | Flexural strength/paper weight per area | 217.2 | 245.5 | 143.8 |
| | Increase in flexural strength | 195.9 | 379.6 | 165.3 |
| | Increased strength/(reinforcement material paper weight per area) | 189.5 | 367.1 | 159.9 |

As is apparent from the above Tables 7 and 8, the decrease in flexural strength due to the effect of humidity is significant when a cardboard is bonded as an additional paper layer. This can be especially critical in an application as a pallet used in transport for an extended period of time under high temperature and/or high humidity conditions.

Example 7

A case where a liner paper layer was bonded to a core manufactured by cutting with the cutting blade shown in FIGS. 7A and 7B and an additional paperboard layer was pasted was compared to a case where a liner paper layer was bonded to a core manufactured by cutting with the common cutting blade shown in FIGS. 7C and 7D and an additional paperboard layer was pasted.

Compared to a board manufactured using the common cutting blade shown in FIGS. 7C and 7D, a board manufactured by using the preferred cutting blade shown in FIGS. 7A and 7B achieved a more stable and higher flexural strength. Specifically, a connection portion of a board manufactured using a common cutting blade may not be able to withstand a high flexural strength, but this was not the case for a board manufactured using the preferred cutting blade.

Example 8

Pallets in Example 8 and Comparative Example were manufactured in the following manner.

Ecoboard® sold by Ecoboard Co., Ltd. (transverse direction 800 mm×longitudinal direction 1150 mm×height 20 mm) was used as the top board 500 of a four-way pallet. Ecoboard substantially has the structure shown in FIG. 1A. 9 of the structures shown as the core 4 in FIG. 1B that were shaped into a size of transverse direction 86 mm×longitudinal direction 170 mm×height 90 mm were prepared as the legs 400. The cutting technique shown in FIGS. 5A to 5C and FIGS. 8A and 8B was used for preparing the legs. A vinyl acetate resin-based emulsion form adhesive, which is a cardboard adhesive, was used as the adhesive.

Commonly available 1100 mm×1350 mm board paper (thickness of 4 mm) was cut into short strips to prepare three 86 mm×1100 mm first bottom boards 200. Further, commonly available 1100 mm×1350 mm board paper (thickness of 2 mm) was cut into short strips to prepare three 170 mm×760 mm second bottom boards 300. The area of board paper used for these 6 bottom boards was about 0.672 m² (there may be some loss in paper upon cutting). The remaining portion of the board paper can be used as a bottom board of other pallets.

The top board 500, legs 400, second bottom boards 300, and first bottom boards 200 prepared as above were bonded as shown in FIGS. 12A to 12C to manufacture the four-way pallet of the invention. The space between legs in the longitudinal direction was 290 mm, and the space between the legs in the transverse direction was 251 mm (see FIG. 13A).

Comparative Example

Parts other than the bottom boards were manufactured in the same manner as in Example 8.

In the Comparative Example, commonly available 1100 mm×1350 mm board paper (thickness of 4 mm) was cut into 760 mm×1100 mm to prepare the bottom boards 130. Four 240 mm×280 mm apertures 600 were cut out and formed on the 760 mm×1100 mm bottom boards 130 (see FIG. 13B). Special equipment such as a wooden pattern and a rotary cutter or a flatbed die cutter is required in order to cut out 4 mm board paper. Furthermore, especially when board paper of 4 mm or greater is cut out, blades of utility knives have a short product life span, resulting in increasing the manufacturing cost. The area of board paper used for the bottom boards was about 0.844 m² (since apertures that were cut out cannot be used in other applications, they are considered used). When a pallet is manufactured in this manner, only one bottom board can be prepared from a single sheet of board paper. Thus, the entire board paper (1.485 m²) is practically used.

Comparison of Example 8 with Comparative Example

It can be understood that the pallet of the invention efficiently uses board paper to prepare bottom boards in comparison to the area of board paper used (about 0.672 m²) in Example 8.

Further, the pallet of Example 8 has a significantly smaller area that is in contact with the ground compared to the same size pallet of the Comparative Example. Thus, moisture absorption into the pallets is suppressed and the area requiring waterproofing is smaller in the pallet of Example 8 relative to the Comparative Example.

Example 9

Four-way pallets were manufactured in the same manner as Example 8, other than making the second bottom boards 300 using 2 mm board paper.

Flexural Strength Test

The flexural strength with respect to single point concentrated load of each pallet in Example 8, Example 9, and Comparative Example was tested at the Hiroshima Prefectural technology Research Institute, Eastern Region Industrial Research Center.

As a result, it was revealed that there is no significant difference in the flexural strength of the pallet of Example 8, the pallet of Example 9, and the pallet of the Comparative Example. It should be noted that only the first bottom boards 200 were 4 mm and the second bottom boards 300 were 2 mm in Example 8, whereas the entire bottom boards 130 were 4 mm in Example 8 and the Comparative Example. The result revealed that waste can be further eliminated by selecting board paper with different thicknesses in the longitudinal direction and the transverse direction as a bottom board in order to increase the flexural strength of a four-way pallet. Specifically, a high flexural strength is generally required in the longitudinal direction of a pallet, so that sufficient flexural strength can be achieved for a pallet as a whole by increasing the thickness of paper weight per area of the first bottom board 200 extending in the longitudinal direction.

INDUSTRIAL APPLICABILITY

The present invention is useful in providing a paper board structure with a high flexural strength at a low cost. The paper board structure provided by the present invention can achieve strength that is comparable to a wood board at a low cost. The paper board structure is suitable for use as, for example, pallets and molds. In addition, the entire paper board structure of the invention can be recycled, so that the paper board structure can provide a significant and positive contribution to environmental issues by reducing use of wood resources.

REFERENCE SIGNS LIST

1 Paper layer 1
2 Paper layer 2
3 Paper layer 3
4 Core
10 Paper board structure
21 Core material
22 Liner
23 Core unit
100 Four way pallet
200 First bottom board
300 Second bottom board
400 Legs
500 top board
600 Aperture

The invention claimed is:

1. A paper board consisting of a board-like structure and a paperboard layer bonded to the board-like structure,
    wherein the board-like structure comprises a core and a first liner paper layer and a second liner paper layer bonded to the core so as to sandwich the core,
    wherein the paperboard layer is bonded to the first liner paper layer, and
    wherein the paper board comprises any of the following items (1) to (3):
    (1) a thickness of the board-like structure is about 15 mm to less than about 20 mm,
        thicknesses of the first liner paper layer and the second liner paper layer are each independently about 0.5 mm to about 1.2 mm,
        a thickness of the paperboard layer is about 1 mm to about 4 mm,
        the thickness of the paperboard layer is about 20% or less of the thickness of the board-like structure, and
        a flexural strength of the paper board is about 450 kg/m or greater;
    (2) a thickness of the board-like structure is about 20 mm to less than about 30 mm,
        thicknesses of the first liner paper layer and the second liner paper layer are each independently about 0.5 mm to about 1.2 mm,
        a thickness of the paperboard layer is about 1 mm to about 4 mm,
        the thickness of the paperboard layer is about 20% or less of the thickness of the board-like structure, and
        a flexural strength of the paper board is about 650 kg/m or greater; and
    (3) a thickness of the board-like structure is about 30 mm to about 40 mm,
        thicknesses of the first liner paper layer and the second liner paper layer are each independently about 0.5 mm to about 1.2 mm,
        a thickness of the paperboard layer is about 1 mm to about 4 mm,
        the thickness of the paperboard layer is about 20% or less of the thickness of the board-like structure, and
        a flexural strength of the paper board is about 950 kg/m or greater.

2. The paper board of claim 1, wherein the thickness of the paperboard layer is about 1 mm to about 2 mm.

3. The paper board of claim 1, wherein the thickness of the paperboard layer is about 15% or less of the thickness of the board-like structure.

4. The paper board of claim 3, wherein the thickness of the paperboard layer is about 10% or less of the thickness of the board-like structure.

5. The paper board of claim 1, wherein the core has a shoulder portion on a surface for bonding with the first liner paper layer or the second liner paper layer.

6. A pallet comprising the paper board of claim 1.

7. The pallet of claim 6, wherein the pallet is a four-way paper pallet having a first direction and a second direction that is orthogonal to the first direction.

8. The pallet of claim 7, the pallet comprising:
a plurality of first bottom board extending in the first direction;
a plurality of second bottom boards, which extend in the second direction and are bonded to the first bottom boards;
a plurality of legs bonded to the second bottom board at a portion where the first bottom board and the second bottom board intersect; and
a top board bonded to the plurality of legs.

9. A mold comprising the paper board of claim 1.

10. A method of manufacturing a paper board with a predetermined flexural strength, comprising the steps of any one of the following (1) to (3):
(1) bonding a core with a first liner paper layer and a second liner paper layer so that the first liner paper layer and the second liner paper layer sandwich the core to form a board-like structure of about 15 mm to less than about 20 mm;
selecting a paperboard layer with a thickness, which is about 1 mm to about 4 mm and is 20% or less of the thickness of the board-like structure, in accordance with the predetermined flexural strength; and
bonding the paperboard layer to a surface of the first liner paper layer;
wherein the first liner paper layer and the second liner paper layer are each independently about 0.5 mm to about 1.2 mm, and
a flexural strength of the paper board is about 450 kg/m or greater;
(2) bonding a core with a first liner paper layer and a second liner paper layer so that the first liner paper layer and the second liner paper layer sandwich the core to form a board-like structure of about 20 mm to less than about 30 mm;
selecting a paperboard layer with a thickness, which is about 1 mm to about 4 mm and is 20% or less of the thickness of the board-like structure, in accordance with the predetermined flexural strength; and
bonding the paperboard layer to a surface of the first liner paper layer;
wherein the first liner paper layer and the second liner paper layer are each independently about 0.5 mm to about 1.2 mm, and
a flexural strength of the paper board is about 650 kg/m or greater;
(3) bonding a core with a first liner paper layer and a second liner paper layer so that the first liner paper layer and the second liner paper layer sandwich the core to form a board-like structure of about 30 mm to about 40 mm;
selecting a paperboard layer with a thickness, which is about 1 mm to about 4 mm and is 20% or less of the thickness of the board-like structure, in accordance with the predetermined flexural strength; and
bonding the paperboard layer to a surface of the first liner paper layer;
wherein the first liner paper layer and the second liner paper layer are each independently about 0.5 mm to about 1.2 mm, and
a flexural strength of the paper board is about 950 kg/m or greater.

11. The method of claim 10, wherein spaces formed in the core extend in a thickness direction between the first liner paper layer a the second liner paper layer.

12. The paper board of claim 1, wherein spaces formed in the core extend in a thickness direction between the first liner paper layer a the second liner paper layer.

* * * * *